(12) United States Patent
Theis et al.

(10) Patent No.: US 11,906,759 B2
(45) Date of Patent: Feb. 20, 2024

(54) OPTICAL FILM WITH LIGHT CONTROL EDGE

(71) Applicant: 3M INNOVATIVE PROPERTIES COMPANY, St. Paul, MN (US)

(72) Inventors: Daniel J. Theis, Mahtomedi, MN (US); Tri D. Pham, Woodbury, MN (US); Bradley S. English, St. Paul, MN (US); Steven J. Botzet, Hudson, WI (US); Qingbing Wang, Woodbury, MN (US); Shu-Ching Fan, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 712 days.

(21) Appl. No.: 17/056,353

(22) PCT Filed: May 20, 2019

(86) PCT No.: PCT/IB2019/054153
§ 371 (c)(1),
(2) Date: Nov. 17, 2020

(87) PCT Pub. No.: WO2019/224698
PCT Pub. Date: Nov. 28, 2019

(65) Prior Publication Data
US 2021/0116611 A1 Apr. 22, 2021

Related U.S. Application Data

(60) Provisional application No. 62/675,031, filed on May 22, 2018.

(51) Int. Cl.
G02B 5/00 (2006.01)
G02B 5/04 (2006.01)
B29D 11/00 (2006.01)

(52) U.S. Cl.
CPC ........ G02B 5/003 (2013.01); B29D 11/00788 (2013.01); B29D 11/00798 (2013.01); G02B 5/04 (2013.01)

(58) Field of Classification Search
None
See application file for complete search history.

(56) References Cited

U.S. PATENT DOCUMENTS

| | | |
|---|---|---|
| 4,984,144 A | 1/1991 | Cobb, Jr. |
| 5,039,207 A | 8/1991 | Green |
| | (Continued) | |

FOREIGN PATENT DOCUMENTS

| | | |
|---|---|---|
| CN | 1684169 | 10/2005 |
| CN | 201515302 | 6/2010 |
| | (Continued) | |

OTHER PUBLICATIONS

International Search Report for PCT International Application No. PCT/IB2019/054153, dated Feb. 3, 2020, 6 pages.

*Primary Examiner* — Derek S. Chapel
(74) *Attorney, Agent, or Firm* — Philip P. Soo

(57) ABSTRACT

An optical film having a first surface, an opposing second surface, and a thickness normal to the first and second surfaces is cut. Cutting the film forms a channel at least partially through the thickness of the film. A light control material is printed proximate to a surface of the film. The ink traverses through the channel by capillary motion.

14 Claims, 19 Drawing Sheets

(56) References Cited

U.S. PATENT DOCUMENTS

| | | |
|---|---|---|
| 5,190,370 A | 3/1993 | Miller |
| 5,783,120 A | 7/1998 | Ouderkirk |
| 5,825,543 A | 10/1998 | Ouderkirk |
| 5,828,488 A | 10/1998 | Ouderkirk |
| 5,882,774 A | 3/1999 | Jonza |
| 5,965,247 A | 10/1999 | Jonza |
| 6,025,897 A | 2/2000 | Weber |
| 6,322,236 B1 | 11/2001 | Campbell |
| 6,354,709 B1 | 3/2002 | Campbell |
| 6,373,635 B1 | 4/2002 | Fujimoto |
| 6,707,611 B2 | 3/2004 | Gardiner |
| 7,622,164 B2 | 11/2009 | Jones |
| 7,726,868 B2 | 6/2010 | Terada |
| 8,318,852 B2 | 11/2012 | Kim |
| 9,011,995 B2 | 4/2015 | Park |
| 9,454,041 B2 | 9/2016 | Matsumoto |
| 9,645,423 B2 | 5/2017 | Seo |
| 2003/0081312 A1 | 5/2003 | Nemoto et al. |
| 2005/0002105 A1 | 1/2005 | Nemoto |
| 2005/0073828 A1 | 4/2005 | Ha |
| 2006/0126173 A1 | 6/2006 | Yakushiji |
| 2007/0279727 A1 | 12/2007 | Gandhi |
| 2010/0110724 A1 | 5/2010 | Moncrieff |
| 2011/0317417 A1 | 12/2011 | Gourlay |
| 2012/0063163 A1 | 3/2012 | Lai |
| 2012/0063167 A1 | 3/2012 | Ozawa |
| 2012/0163020 A1 | 6/2012 | Inada |
| 2013/0044511 A1 | 2/2013 | Motooka |
| 2014/0065397 A1 | 3/2014 | Johnson |
| 2014/0078719 A1 | 3/2014 | Jung |
| 2014/0092625 A1 | 4/2014 | Lin |
| 2015/0130069 A1* | 5/2015 | Mahajan ........... H01L 21/76834 257/773 |
| 2015/0183178 A1 | 7/2015 | Lindquist |
| 2016/0124126 A1 | 5/2016 | Vasylyev |
| 2019/0273061 A1* | 9/2019 | Mahajan ................. H01L 23/13 |

FOREIGN PATENT DOCUMENTS

| | | |
|---|---|---|
| CN | 102495499 | 6/2012 |
| CN | 204477809 | 7/2015 |
| CN | 106019719 A | 10/2016 |
| CN | 104949011 | 5/2018 |
| EP | 1009135 | 6/2000 |
| EP | 3021162 | 5/2016 |
| GB | 2468411 | 9/2010 |
| JP | H07-046383 | 2/1995 |
| JP | 2001-021703 | 1/2001 |
| JP | 2004-070188 | 3/2004 |
| JP | 2007-329099 | 12/2007 |
| JP | 2014092615 A | 5/2014 |
| JP | 2015-114343 | 6/2015 |
| KR | 2008-0020842 | 3/2008 |
| KR | 2008-0100798 | 11/2008 |
| KR | 2009-0053087 | 5/2009 |
| KR | 2009-0075456 | 7/2009 |
| KR | 101262885 | 5/2013 |
| WO | WO 2014-042178 | 3/2014 |
| WO | WO 2015-074202 | 5/2015 |

\* cited by examiner

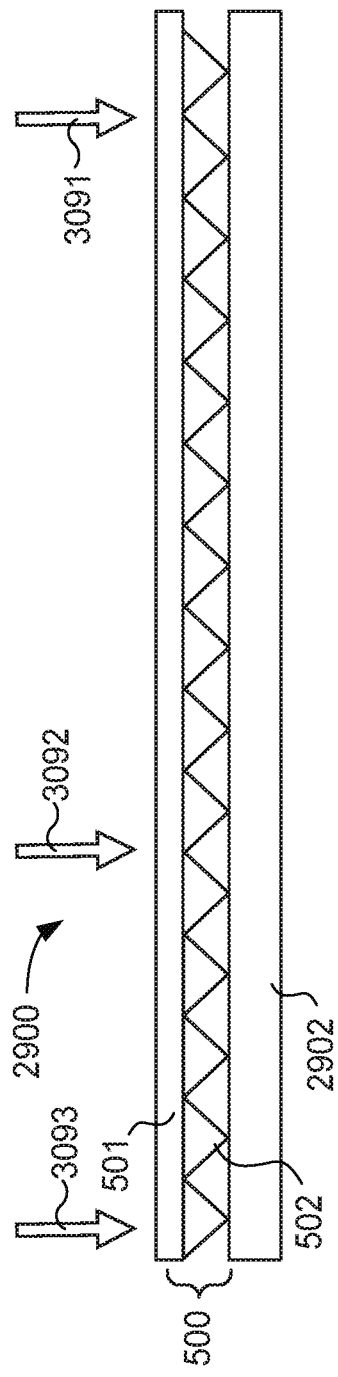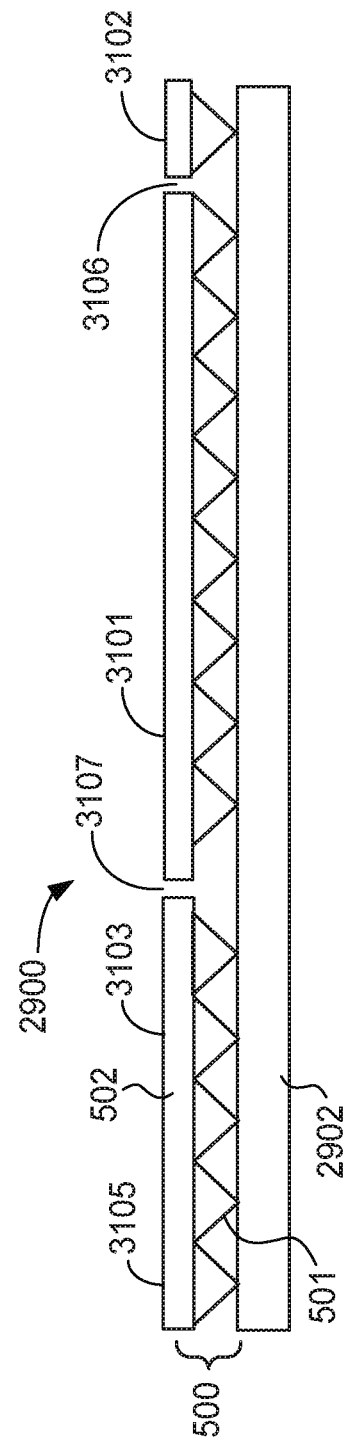

OPTICAL FILM WITH LIGHT CONTROL EDGE

CROSS REFERENCE TO RELATED APPLICATIONS

This application is a national stage filing under 35 U.S.C. § 371 of PCT/IB2019/054153, filed May 20, 2019, which claims the benefit of Provisional Application No. 62/675,031, filed May 22, 2018, the disclosure of which is incorporated by reference in its/their entirety herein.

BACKGROUND

Various types of optical films can be useful to control light emitted by a light source of a display system. For example, in electronic devices such as televisions, laptop computers, tablets, and telephones, brightness enhancing films can provide display system brightness gains of up to 120%.

BRIEF SUMMARY

Some embodiments described herein involve a method of light control for an optical film. An optical film having a first surface, an opposing second surface, and a thickness normal to the first and second surfaces is cut, the cutting forming a channel at least partially through the thickness of the film. A light control material is printed proximate to a surface of the film. The light control material traverses through the channel by capillary motion.

According to some embodiments, a method involves cutting an optical film having a first surface, an opposing second surface comprising microstructures, and a thickness normal to the first and second surfaces. Cutting the optical film forms a channel through the thickness of the film. A light control ink is printed toward the first surface of the film. The ink traverses through the channel and between the microstructures of the second surface by capillary movement. The capillary movement of the ink is controlled such that the ink moves a predetermined distance from the channel between the microstructures of the second surface.

Some embodiments are directed to a method of using an optical film. According to the method, light is received by an optical film having a structured surface, an opposing surface, and one or more edges extending between the structured and opposing surfaces. Light received at angles greater than or equal to a critical angle for total internal reflection at microstructures of the structured surface of the optical film is reflected. Light received at angles less than the critical angle for total internal reflection from the structured surface of the optical film is emitted. Light is absorbed or reflected by a layer of ink disposed at edges of the optical film.

In accordance with some embodiments an optical film includes a first surface, an opposing second surface, and an edge between the first and second surfaces. A light control layer comprising ink is disposed on the edge. The light control layer absorbs or reflects light.

BRIEF DESCRIPTION OF DRAWINGS

FIGS. 29 through 33 illustrate a process of applying an edge light control layer in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Figure 1:
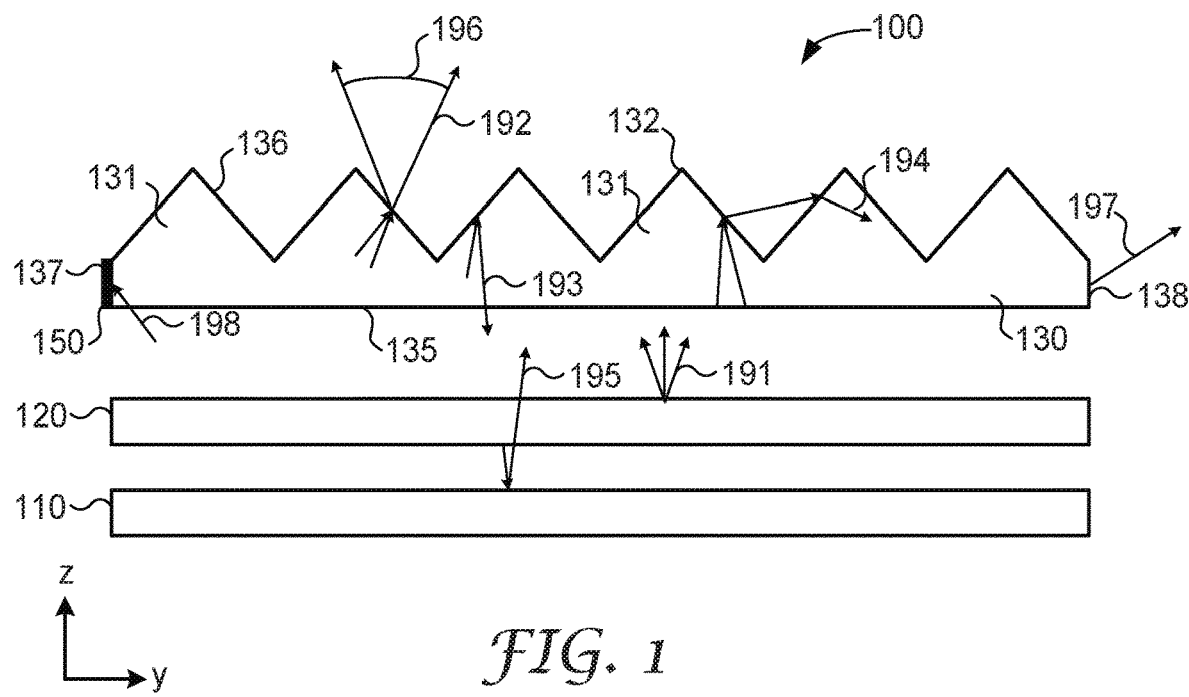
FIG. 1 depicts a cross sectional view of a portion of a backlight system that includes an optical film which may have a light control layer in accordance with disclosed embodiments.

This disclosure generally relates to optical films having one or more layers disposed along the edge of the films that control leakage light at edges of the optical films and to methods for making and using such films. A brightness enhancing film (BEF) is an example of an optical film for which an edge light leakage control layer can be useful, particularly when the BEF is deployed in a display system. It is a common practice in liquid crystal display (LCD) design to use discrete light emitting diodes (LEDs) which may be located at the edges of the display. The goal of LCD lighting design is to guide the light from discrete LEDs through the optical film and out of the emitting face of the display, thus providing an illuminating "sheet" that provides a backlight for the individual liquid crystal color elements. The film that guides the light from the edge positioned LEDs to the face is sometimes referred to as a light guide. Edge emission from the light guide can cause an edge glow around the perimeter of the display which is an undesirable optical phenomenon and also reduces the lighting efficiency of the display. The embodiments discussed herein are directed to devices and methods involving coating the edge of optical films, such as the light guiding film itself and/or optical films used in conjunction with the light guide to either absorb light that would be emitted from the edge (reducing edge glow) or reflect light that would be emitted from the edge back into the light guide (increasing lighting efficiency). Optical films that may utilize the edge light leakage control approaches discussed herein may include one or more of a light guiding film, a turning film, a brightness enhancement film, a specular reflector film, a diffuser film, a light guiding film, a film comprising a microstructured surface, and a composite multilayer film comprising a stack of optical films, for example.

Some methods for making an optical film having a light leakage control layer described herein include cutting a laminate optical stack and then over printing a light control material in registration with the cut pieces. The cutting may be performed, for example, by rotary die cutting, platen die cutting, or laser cutting. The printing may be performed, for example, by ink jet printing or flexographic printing. In some embodiments, the use of fiducial marks, which may be created concurrently with cutting the pieces, are used for registration of printing onto the cut pieces. In some embodiments, the cure rate of the light control material is controlled such that the light control material moves through cut channels and/or onto surfaces the cut parts. For example, the flow of the light control material can be controlled such that the light control material moves through the cut channels but does not substantially coat the surfaces of the cut parts. In some embodiments, the flow of the light control material may be controlled to substantially coat a region on the surface of the film that is a predetermined distance from the film edge. For example, the predetermined distance may be less or equal to 50 µm, from about 50 µm to 100 µm, from about 100 µm to about 200 µm, from about 50 µm to 500 µm, or up to about 5000 µm.

FIG. 1 depicts a cross sectional view of a portion of a backlight system 100 that includes a BEF 130 which may have a light control layer 150 in accordance with disclosed embodiments disposed at an edge 137 of the BEF 130. The light control layer 150 is configured to control leakage light which would otherwise be emitted from the edge 137. The backlight system 100 may include one or more light sources, such as light emitting diodes (not shown), and a light guiding layer 120. In the illustrated embodiment, the light guiding layer 120 is disposed between a reflector 110 and the BEF 130. In this particular example, the BEF 130 comprises a first major surface 135 and an opposing second major surface 136 that is structured. In the illustrated example, the second major surface 136 has microstructures comprising prisms 131 with elongated peaks 132. The peaks 132 face away from the light guiding layer 120 in the illustrated embodiment of FIG. 1, but may alternatively face toward the light guiding layer in other embodiments. Opposing edges 137, 138 of the BEF 130 extend between the first and second major surfaces 135, 136. One or more of the edges 137, 138 may comprise a light control layer 150. In FIG. 1, a light control layer 150 is disposed at the left edge 137 of the BEF 130 and no light control layer is disposed at the right edge of the BEF 130.

The backlight 100 may include other layers, e.g., optical diffuser layers, polarizer films, etc. Any of the layers of the backlight 100 may include a light leakage control layer at the film edge as described herein. Although brightness enhancement films are used to illustrate the disclosed embodiments relating to the light leakage control layer, the approaches described herein are generally applicable to any optical film for which light leakage control is desired. A few examples of optical films that may include edge light leakage control layers according to the disclosed approaches are described in U.S. Pat. Nos. 4,984,144; 5,190,370; 5,783,120; 5,825,543; 5,828,488; 5,882,774; 5,965,247; 6,025,897; 6,322,236; 6,354,709; 6,707,611; and 7,622,164 which are incorporated herein by reference. Many other optical films may incorporate the edge leakage control layer as disclosed herein.

The BEF 130 utilizes refraction and reflection to increase the efficiency of the backlight 100. Light 191 is emitted from the light guiding layer 120 toward the BEF 130. The BEF 130 refracts and emits some of the light 192 from the light guiding layer 120. The emitted light 192 is emitted at angles within a viewing cone 196 (e.g., up to 35° off the perpendicular) toward the viewer. A portion 193 of the light 191 from the light guiding layer 120 that is outside the viewing cone 196 is reflected back toward the light guiding layer 120 and reflector 110. A portion 194 of the light 191 from the light guiding layer 120 is refracted by the face of a BEF prism 131 through an adjacent prism 131 and back toward the light guiding layer 120 and reflector 110. Light 193, 194 is recycled between the BEF 130 and the reflector 110 until the recycled light 195 achieves the proper angle to exit the BEF 130.

To illustrate the phenomenon of light leakage at the edges of the BEF 130 in the backlight 100 of FIG. 1, the left edge 137 of the BEF 130 has an edge light control layer 150 as disclosed herein and the right edge 138 of the BEF 130 has no edge light control layer. Without edge light control at the right edge 138 of the BEF 137, light from the light guide 120 may exit the BEF 137 through the edge 138. The leakage light 197 causes an edge glow effect that is unpleasant for the viewer. Edge glow may occur from one or both of the vertical edges of the BEF 137, and from the surface of the prisms 131 near the vertical edge. The edge light control approaches described herein reduce the amount of edge leakage light.

Figure 2:
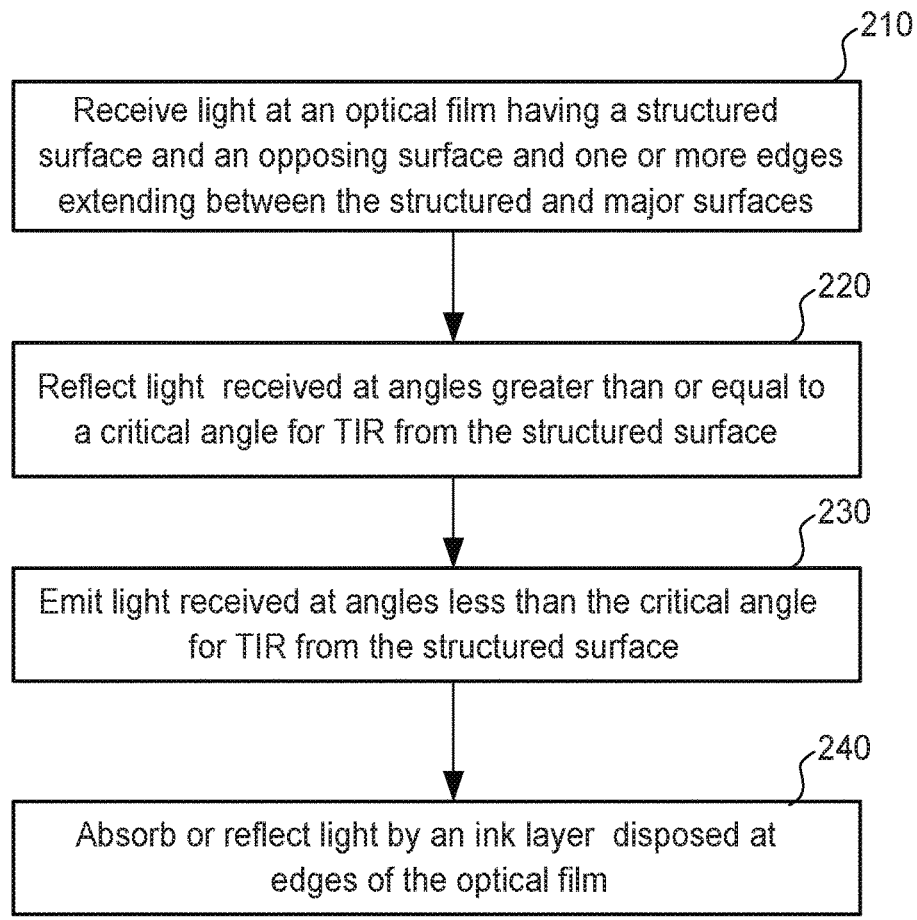
FIG. 2 is a flow diagram illustrating a process of using an optical film that includes a light control layer as shown in FIG. 1.

FIG. 2 is a flow diagram illustrating a process of using a BEF 130 that includes the light control layer 150 as shown in FIG. 1. Light 191 from the light guiding layer 120 is received 210 by the BEF 130, the BEF 130 having a structured surface 136, an opposing surface 135, and one or more edges 137, 138 extending between the structured 136 and opposing 135 surfaces. Light 193 incident on the microstructures 131 of the structured surface 136 at angles greater than or equal to the critical angle for total internal reflection (TIR) is reflected 220 by the structured surface 136. Light 192 that is incident on the microstructures 131 of the structured surface 136 at angles less than the critical angle for TIR is emitted 230 from the structured surface 136 of the BEF 130. Light 198 incident on the light control layer 150 disposed at an edge 137 of the BEF 130 is attenuated or is not emitted from the BEF 130. Light 198 may be absorbed or reflected 240 by the light control layer 150, for example. In some scenarios, the light control layer 150 provides for TIR of the light 198.

Figure 3A:
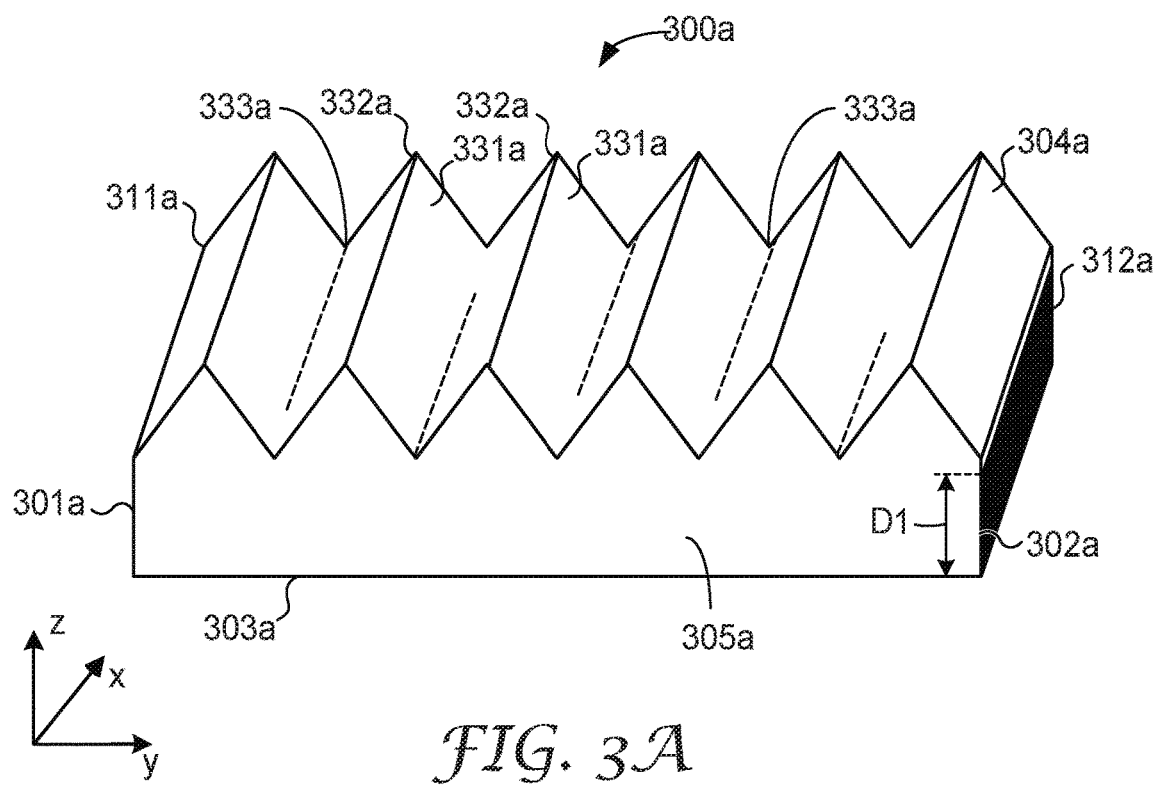
FIG. 3A illustrates a perspective view of a BEF having a light control layer disposed at an edge of the film in accordance with some embodiments.

FIG. 3A illustrates a perspective view of a BEF 300a having a light control layer 312a disposed at an edge 302a of the film 300a in accordance with some embodiments. As previously mentioned, a BEF 300a is used to illustrate the light control layer 312a, however, it will be appreciated that the light control approaches described herein may be applied to any type of optical film.

The BEF 300a includes a first major surface 303a and a second major surface 304a which is structured. The structured surface 304a comprises a series of prisms 331a having elongated peaks 332a and valleys 333a that extend along the x axis of the BEF 300a as illustrated in FIG. 3. The edges 301a, 302a, 305a of the BEF 300a extend between the first and second major surfaces 303a, 304a. A light control layer 312a comprising an ink layer is disposed at the right edge 302a of the BEF 300a in this embodiment. The light control layer 312a is formed by capillary motion of the ink. The capillary motion may be controlled such that the light control layer 312a extends to cover some, most or all of the BEF edge 302a along the x and/or z directions. As shown in FIG. 3A, the movement of the ink may be controlled such that the light control layer 312a substantially covers a predetermined distance, D1, of the edge 302a.

Figure 3B:
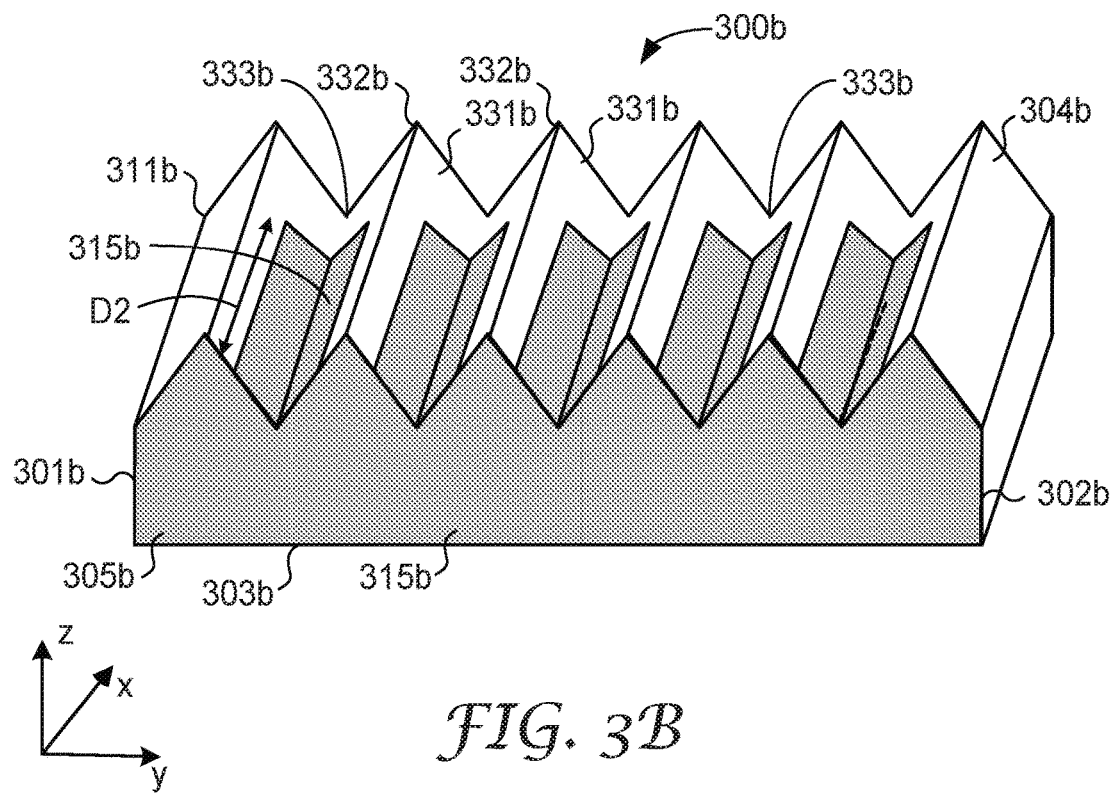
FIG. 3B illustrates a perspective view of an optical film having a light leakage control layer disposed at an edge and partially over a surface of the film in accordance with some embodiments.

FIG. 3B illustrates a perspective view of a BEF 300b having a light control layer 315b disposed at an edge 305b and over the surface of the film 300b in accordance with some embodiments. The BEF 300b includes a first major surface 303b and a second major surface 304b that is structured. The structured surface 304b comprises a series of prisms 331b having elongated peaks 332b and valleys 333b that extend along the x axis of the BEF 300b as illustrated in FIG. 3B. The edges 301b, 302b, 305b of the BEF 300b extend between the first and second major surfaces 303b, 304b. A light control layer 315b comprising an ink layer is disposed at the front edge 305b of the BEF 300b in this embodiment. The light control layer 315b is formed by capillary motion of ink after the ink is deposited proximate to the first (unstructured) surface 303b. The capillary motion may be controlled such that the light control layer 315b extends to cover some, most or all of the BEF edge 305b along the y and/or z directions. In some scenarios, the ink of the light control layer 315b may move by capillary motion within the valleys 333b (along the x axis) of the microstructures 331b of the second (structured) major surface 304b. As shown in FIG. 3B, the movement of the ink may be controlled such that the light control layer 315b substantially covers a predetermined distance, D2, of the structured surface 304b of the film 300b as measured from the edge 305b.

Figure 4:
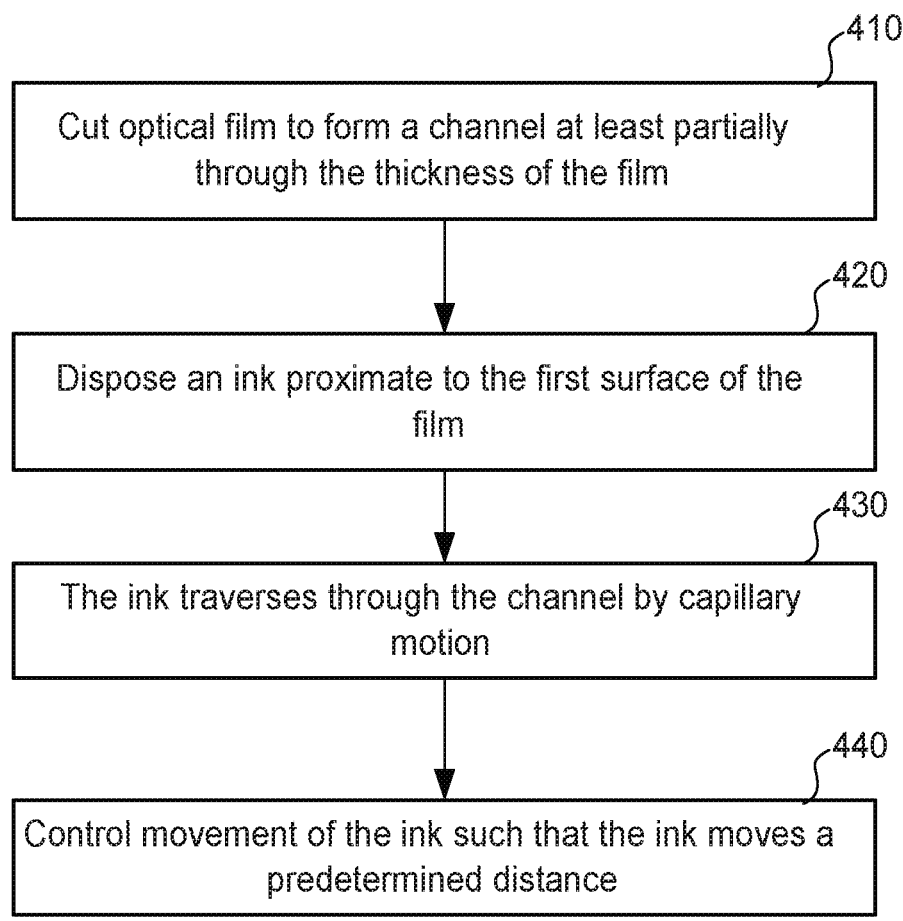
FIG. 4 is a flow diagram of a process of forming a light leakage control layer in accordance with some embodiments.

FIG. 4 is a flow diagram of a process of forming a light leakage control layer in accordance with some embodiments. An optical film, having a first major surface and an opposing second major surface, is cut 410, forming a channel that extends at least partially through the thickness of the film between the first and second major surfaces. An ink, adhesive, or other flowable light control material is disposed 420 proximate to the first surface of the optical film. (The ink, adhesive and/or other flowable light control materials are collectively referred to as "flowable light control materials" or "ink" in this disclosure.) The ink traverses 430 at least partially through the channel by capillary motion. The movement of the ink is controlled 440 such that the ink moves partially or fully through the capillary channel or moves through the capillary channels formed on the second surface of the film by the valleys of the microstructures on the second surface of the film. For example, the movement of the ink may be controlled by using an amount of ink and/or cure rate that facilitates ink movement so as to substantially cover a predetermined distance along the edge of the film with ink. The movement of the ink may be controlled by using an amount of ink and/or ink cure rate that facilitates ink movement to substantially cover the structured surface of the film with ink a predetermined distance from the film edge. For example, the predetermined distance may be less or equal to 50 μm, from about 50 μm to 100 μm, from about 100 μm to about 200 μm, or from about 50 μm to 500 μm, or from about 500 to 5000 um.

The ink may be cured by heating, drying, exposure to UV radiation, etc. In some embodiments, the ink may be cured by ultraviolet light, for example. The width of the capillary channel, the amount and/or viscosity of the ink, the intensity of the curing energy and the time between printing and exposure to curing energy (e.g., intensity and/or exposure time to the curing energy) are parameters that affect the amount of ink movement. For example, the ink may be exposed to a low intensity UV light, e.g., having an intensity of about 100 mW/cm$^2$ at 385 nm wavelength, to "pin" the ink. The term "pinning the ink" as used herein expresses the process of beginning the curing process, partially curing/crosslinking the ink and thereby raising ink viscosity. The method has been shown to result in a reduced wicking line on the optical film from a 250-300 micron wicking range down to a more constant 50 micron wicking line. Additionally or alternatively, the distance that the ink wicks may be controlled by techniques such as ink viscosity, substrate surface texture, size (gap between sidewalls) of the wicking channel, and surface energy of the substrate(s).

In some embodiments, the ink flow may be controlled such that the ink does not coat the structured surface of the film. In some embodiments, the ink flow may be controlled such that the ink substantially coats less than the structured surface of the film Flowable light control materials useful for the disclosed embodiments include optically absorbing or optically reflective materials. Examples of flowable light control materials suitable for a light control layer as discussed herein include inks that are substantially opaque (<20% transmissive in the visible spectrum, when cured) or inks that are substantially reflective in the visible spectrum.

Figure 5:
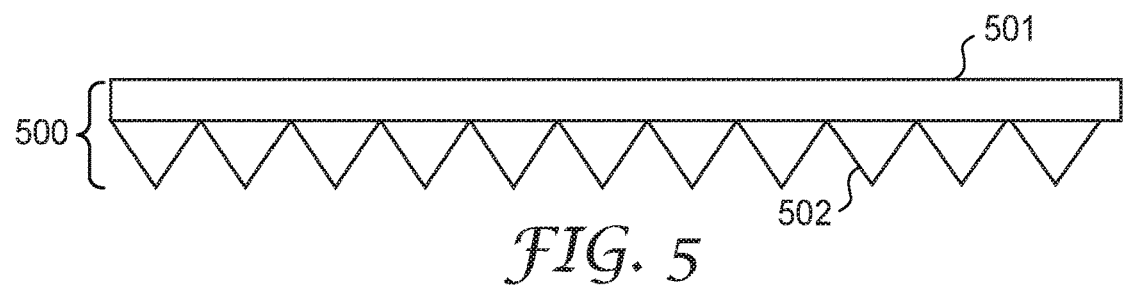
FIGS. 5 through 11 illustrate a process for forming an optical film having an edge light control layer in accordance with some embodiments.
Figure 6:
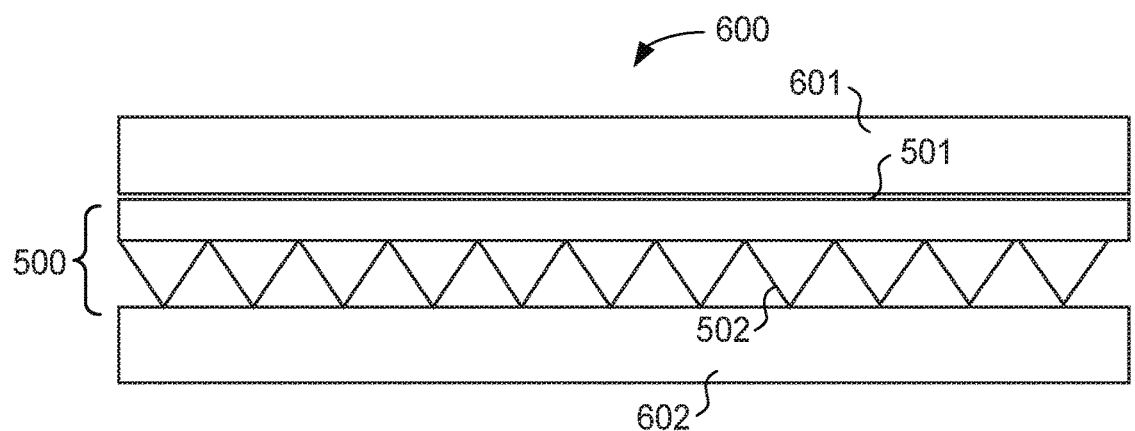
Figure 7:
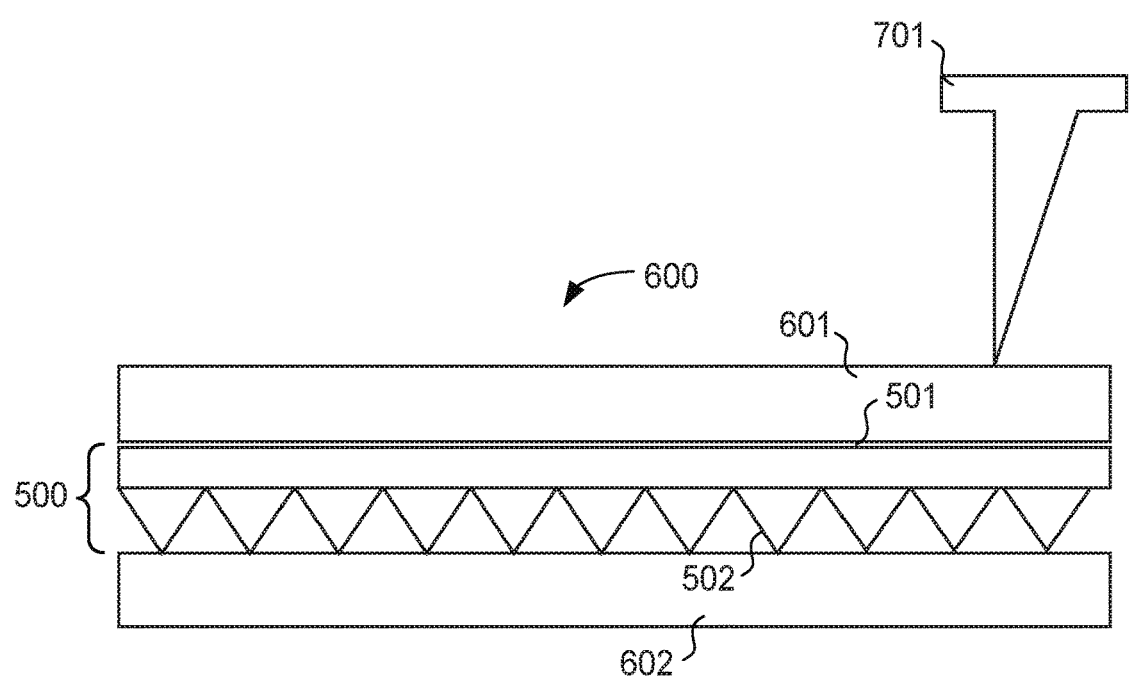
Figure 8:
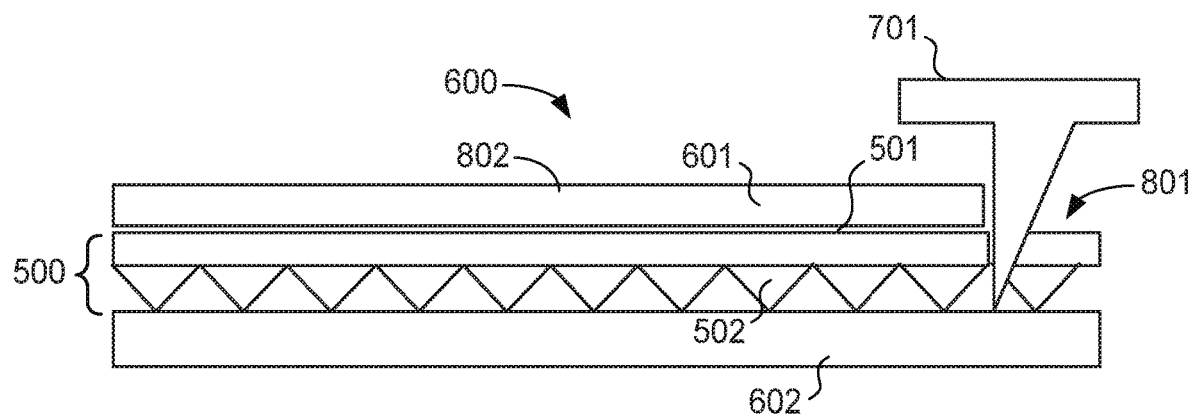
Figure 9:
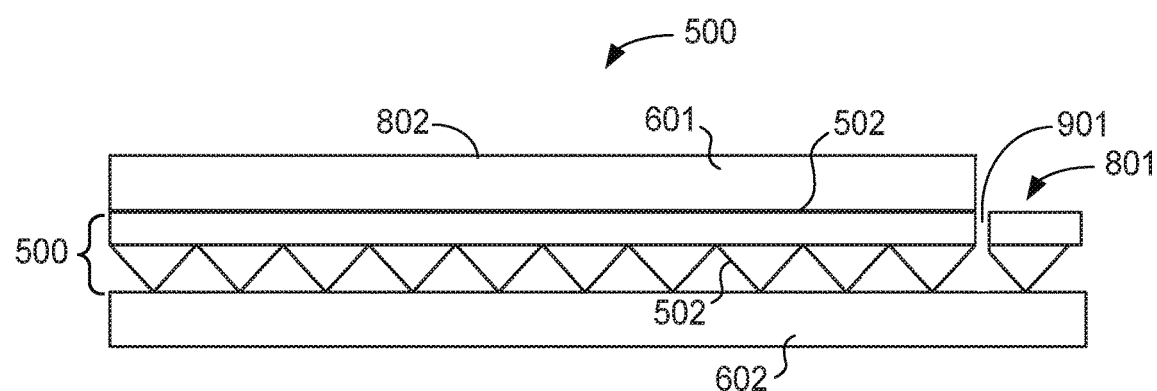
Figure 10:
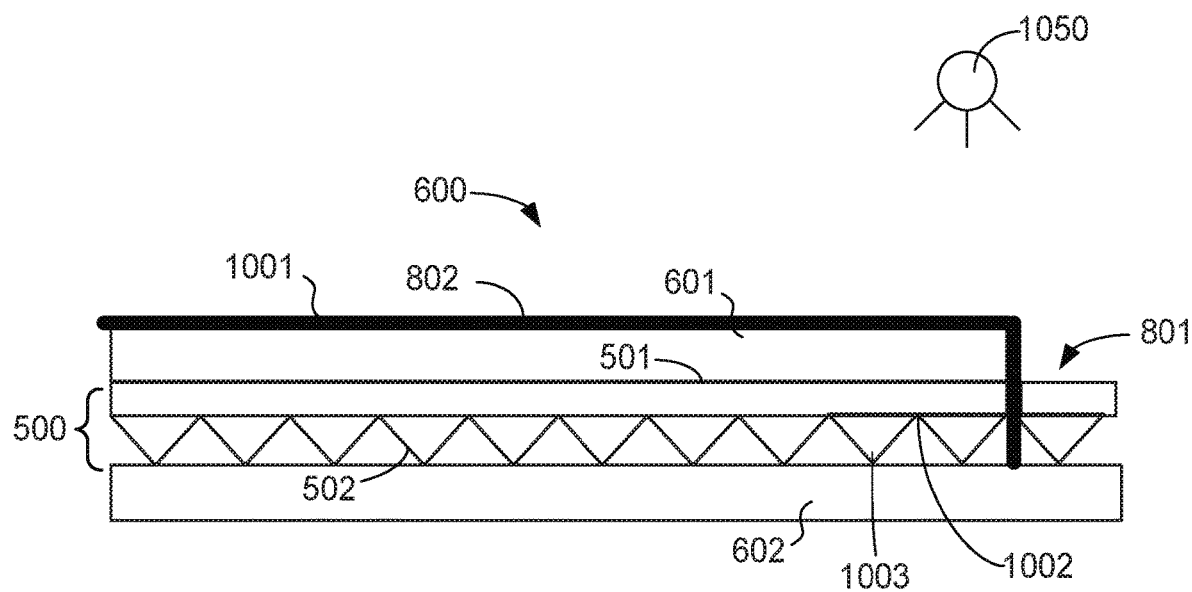

FIGS. 5 through 11 illustrate a process for forming an optical film having an edge light control layer that controls leakage light from the edge of the optical film in accordance with some embodiments. FIG. 5 shows a BEF 500 before a light control layer is installed. The BEF 500 has a first major surface 501 and an opposing second major surface 502, which is structured in this particular example. As shown in FIG. 6, first and second premask liners 601, 602 are disposed over the major surfaces 501, 502 of the BEF 500. The subassembly 600 shown in FIG. 6 is then converted by kiss cutting, e.g., by rotary or platen die cutting and/or by laser cutting, through the first liner 601 and the BEF 500 to the second liner 602. FIG. 7 shows a knife blade (die) 701 poised to cut the subassembly 600. FIG. 8 depicts the step in which the blade 701 kiss cuts through the first liner 601 and the BEF 500 to the second liner 602. The second liner 602 remains intact and keeps the cut off region 801 attached to the major portion 802 of the subassembly 600. Cutting the subassembly 600 produces a capillary channel 901 between the cut off region 801 and the major portion 802 of the subassembly 500 as illustrated in FIG. 9.

Figure 11:
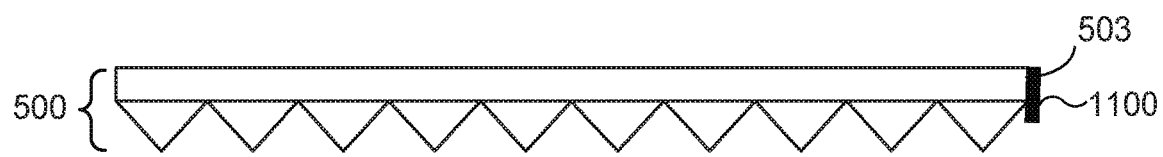

A black ink 1001, adhesive, or other flowable light control material (collectively to herein as "ink") is disposed over the first liner 601 (FIG. 10), e.g., by printing or other suitable deposition method. Printing the ink may be accomplished by flexographic or ink jet printing, for example, or by any other suitable printing methods. The ink 1001 is wicked through the channel 901 by capillary motion. The movement of the ink 1001 is controlled such that the ink 1001 moves by capillary motion a through the channel 901 covering a predetermined distance of the channel 901 with ink. As previously discussed, in some scenarios, the movement of the ink 1001 may be controlled such that the ink 1001 wicks by capillary motion along the valleys 1002 of the microstructures 1003 of the structured surface 502 of the BEF 500. In these scenarios, the flow of ink may be controlled to cover a region of the structured surface that is a predetermined distance from the edge of the film. FIG. 11 shows the BEF 500 with an edge light control layer 1100. The movement of the ink may be at least partially controlled by partially UV curing the ink, using a UV light source 1050 positioned near the channel 901, to increase the viscosity of the ink. In FIG. 11, both liners (see 601, 602 in FIG. 10) and the cut off portion of the BEF (see 801 in FIG. 10) have been removed leaving the BEF 500 and light control layer 1100 disposed along the BEF edge 503.

Figure 12:
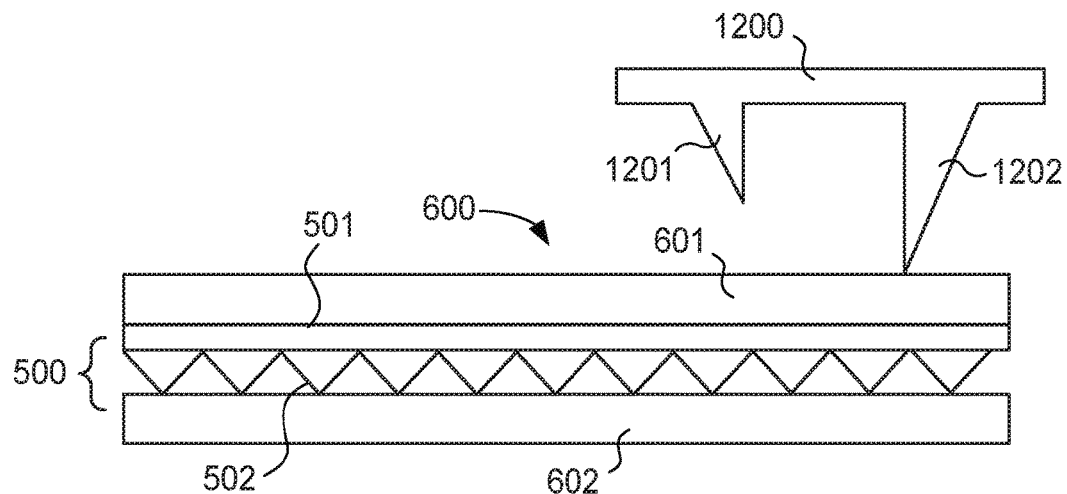
FIGS. 12 through 17 illustrate a process of applying a light control layer to an optical film including printing onto an exposed region of the film in accordance with some embodiments.

In some implementations, it can be useful to apply the light control layer to the edge of the film and to portions of the first major surface to provide for additional light leakage control near the edge of the film. FIGS. 12 through 17 illustrate a process of applying a light control layer to an optical film in accordance with some embodiments. FIG. 12 illustrates a cutting knife (die) 1200 having first 1201 and second 1202 blades poised to cut a subassembly 600. Subassembly 600 comprises a BEF 500 with a first liner 601 disposed over a first major surface 501 of the BEF 500 and a second liner 602 disposed over the second major surface 502 of the BEF 500.

Figure 13:
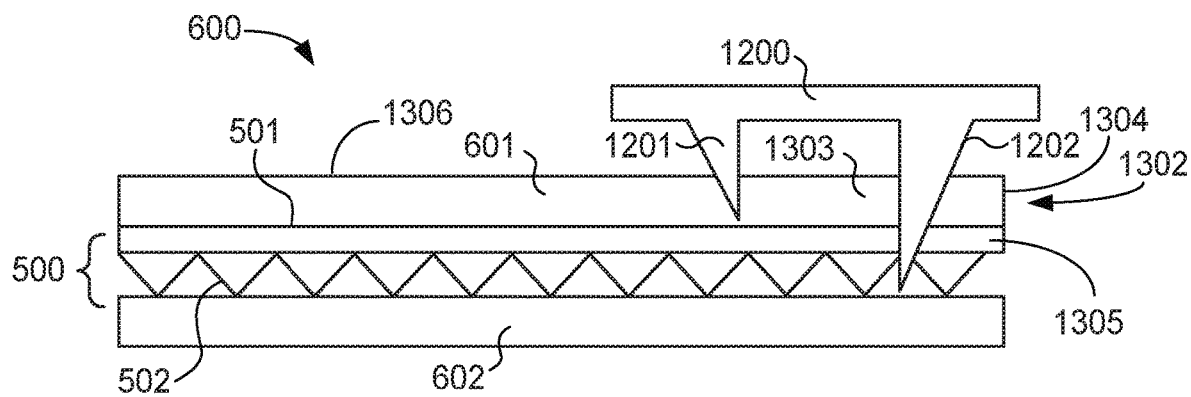
Figure 14:
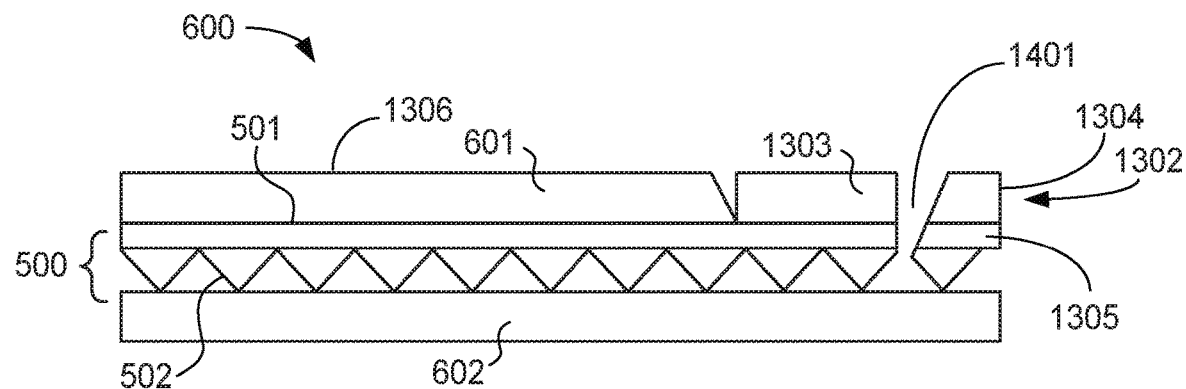
Figure 15:
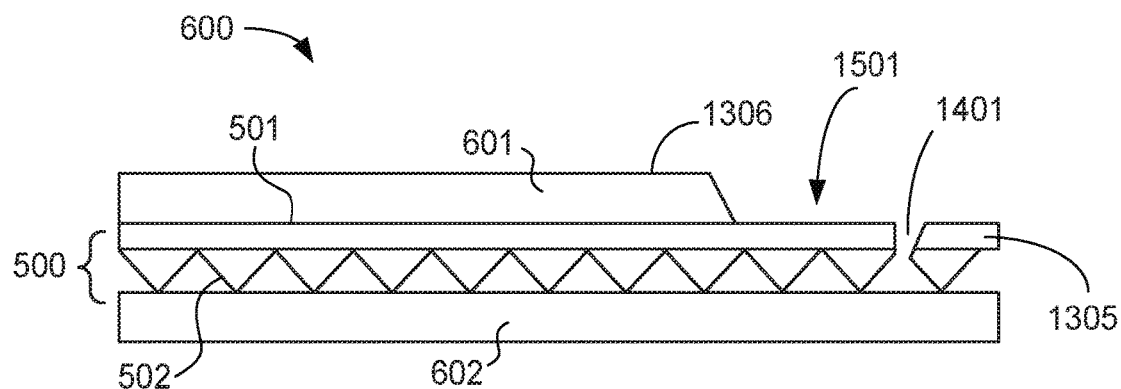

FIG. 13 illustrates the knife 1200 cutting the subassembly 600. The first blade 1201 kiss cuts through the first liner 601 to the first surface 501 of the BEF 500. The second blade 1201 kiss cuts through the first liner 601 and the BEF 500 to the second liner 602. The cutting produces a first and second portions 1302, 1303 that are cut off from a major portion 1306 of the subassembly 600. Cutting by the first knife produces a first cut off portion 1303 of the first liner 601. Cutting by the second knife produces a second cut off portion 1302. The second cut off portion 1302 comprises a second cut off portion 1304 of the first liner 601 and a first cut off portion 1305 of the BEF 500. (The cut off portions 1303, 1304, 1305 are also referred to as "weeds".) FIG. 14 shows the subassembly 600 with the knife 1200 removed. The cutting produces a capillary channel 1401 between the second cut off portion 1302 and the major portion 1306 of the subassembly 600. FIG. 15 shows the subassembly 600 after the cut off liner portions 1303, 1304 have been removed.

Figure 16:
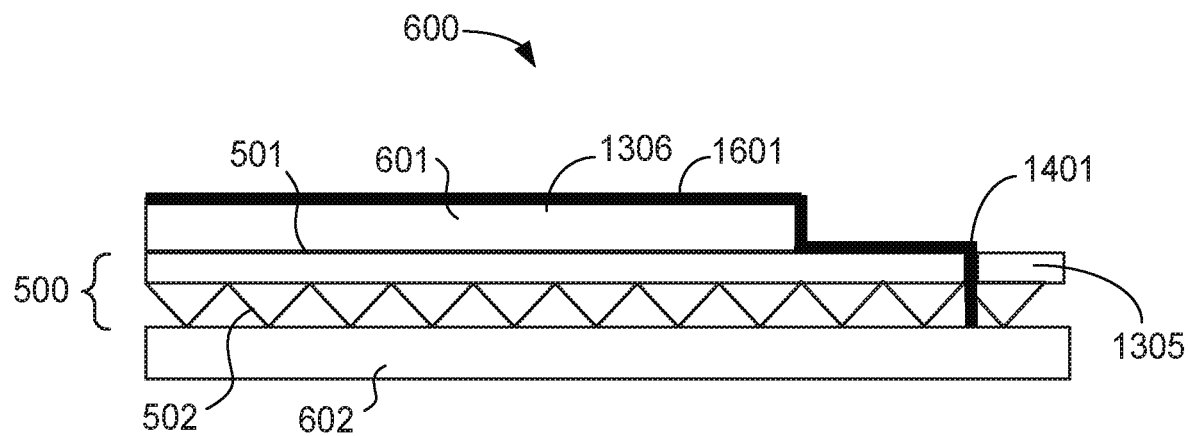

As depicted in FIG. 16, a flowable ink 1601 is applied to a portion of the surface of the first liner 601 and to the portion 1501 of the first surface 501 of the BEF 500 that was exposed by removal of the cut off liner portion 1303. The ink 1601 moves by capillary motion at least partially through the channel 1401 between the BEF cut off portion 1305 and the major portion 1306 of the subassembly 600.

Figure 17:
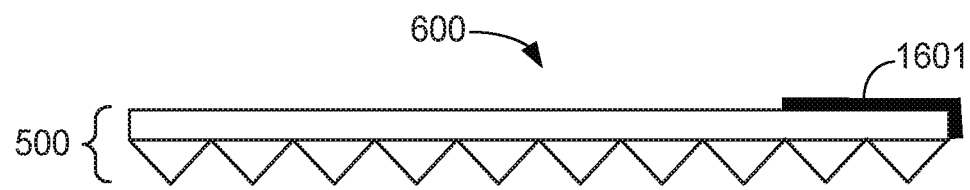

FIG. 17 illustrates the subassembly 600 after removal of the first and second liners 601, 602 and the cut off portion 1305 showing the ink 1601 disposed along the right edge of the BEF 500 and the portion 1501 of the BEF 500 that was exposed by removal of cut off portion 1303.

In many implementations, it is useful to stack optical films. The stack of optical films may include films of the same type or different types. In some implementations, first and second layers of BEF may be stacked with the prism axis of the first BEF oriented at an angle, e.g., 45 degrees, 90 degrees, etc., with respect to the prism axis of the second BEF. FIGS. 18 through 28 illustrate processes for applying ink as a light leakage control edge to an optical film stack in accordance with some embodiments.

Figure 18:
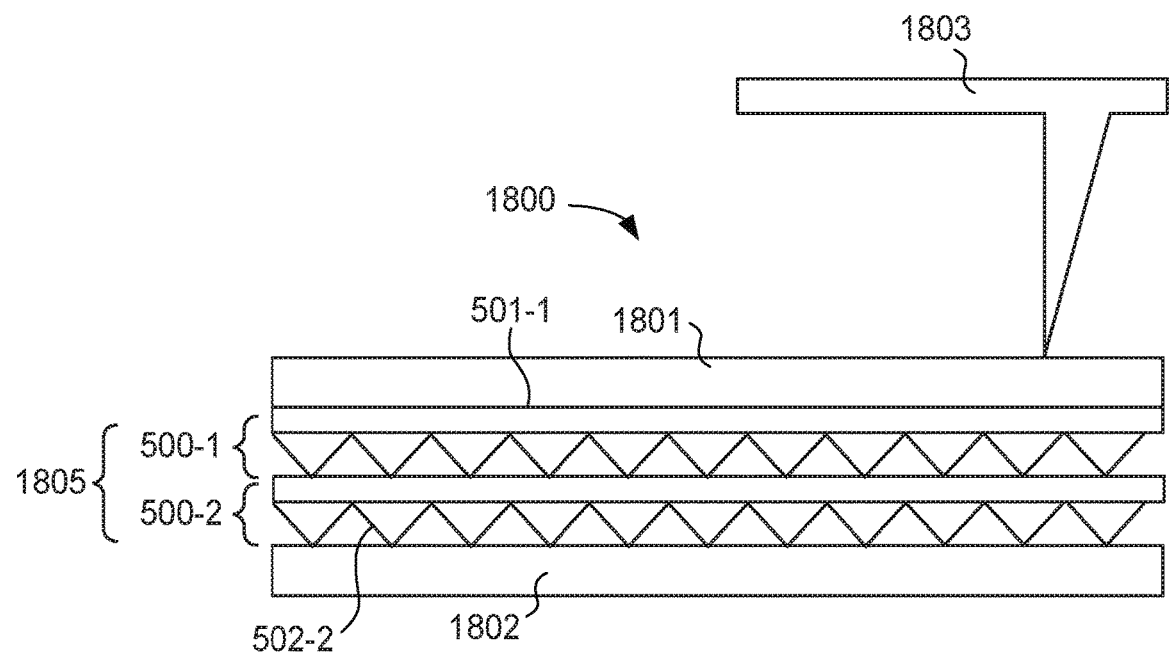
FIGS. 18 through 22 depict steps in a process for forming an ink layer at an edge of an optical film stack that provides edge light control for the stack in accordance with some embodiments.
Figure 19:
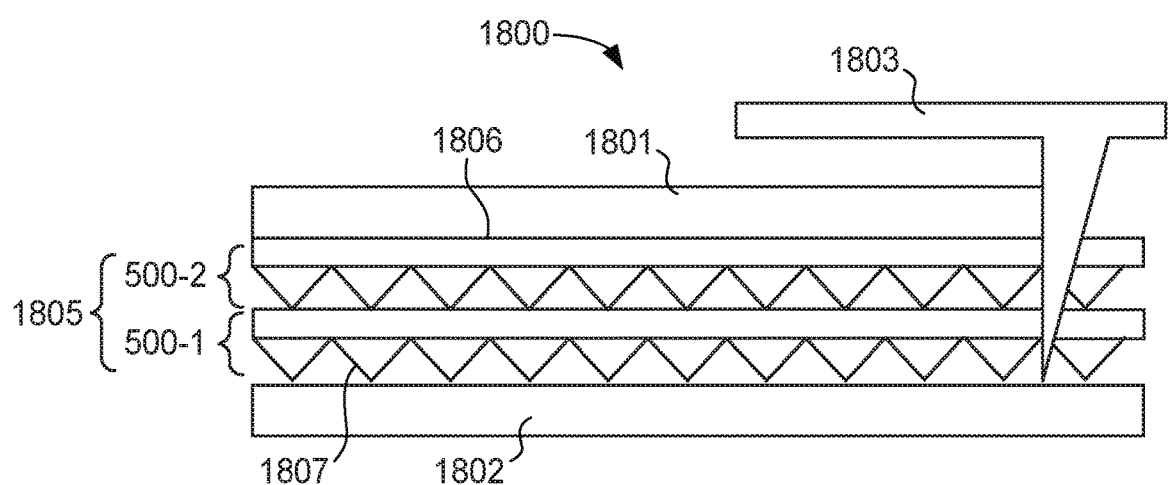
Figure 20:
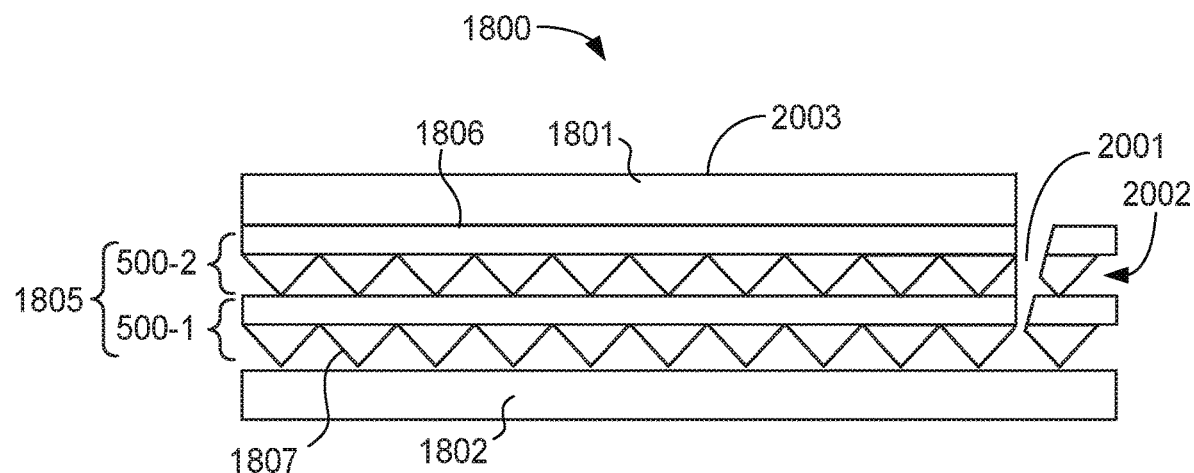

FIGS. 18 through 22 depict steps in a process for forming an ink layer at an edge of an optical film stack that provides edge light control for the stack in accordance with some embodiments. FIG. 18 depicts a subassembly 1800 that includes an optical film stack 1805 comprising first 500-1 and second 500-2 BEFs. In some implementations, the BEFs 500-1, 500-2 may be stacked such that the axes of the linear prisms of the first and second BEFs 500-1, 500-2 are disposed at an angle to one another. A first liner 1801 is disposed on a first surface 1806 of the optical film stack 1805 and a second liner 1802 is disposed on the second surface 1807 of the optical film stack 1805. FIG. 18 shows a single-bladed knife 1803 poised to cut the optical film stack 1805. FIG. 19 shows the subassembly 1800 after the knife blade 1803 kiss cuts through the first liner 1801 and the optical film stack 1805 to the second liner 1802. FIG. 20 shows the subassembly 1800 after the knife 1803 is withdrawn. The cutting creates a capillary channel 2001 through the optical film stack 1805 between the cut off portion 2002 and the major portion 2003 of the subassembly 1800.

Figure 21:
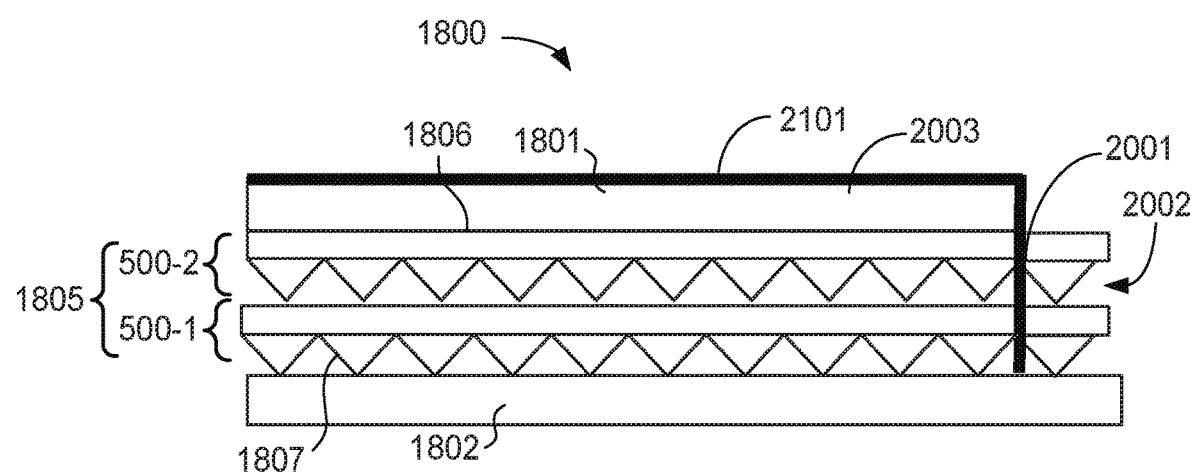
Figure 22:
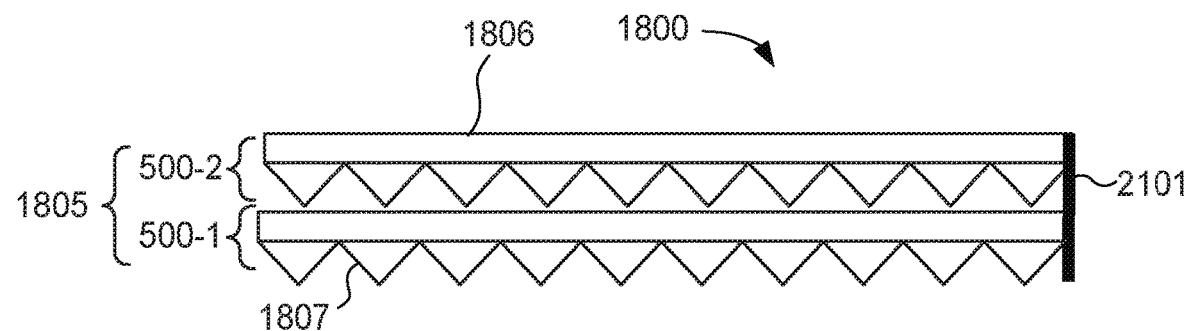

An ink 2101 is disposed on the first liner 1801 as show in FIG. 21 and flows by capillary motion through the channel 2001. The extent of the movement of the ink 2101 through the capillary channel can be controlled. For example, the movement of the ink 2101 can be controlled by controlling the cure rate of the ink, in conjunction with the viscosity of the ink and the width of the capillary channel 2001. These parameters control the distance that the ink is flowable and moves within the channel 2001 and/or through the capillary channels formed between microstructures on the second surface 1807 of the optical film stack 1805. FIG. 22 shows the subassembly 1800 after the first and second liners have been removed. The right hand edge of the optical film stack 1805 includes an ink layer 2101 that provides edge leakage light control for the optical film stack 1805.

Figure 23:
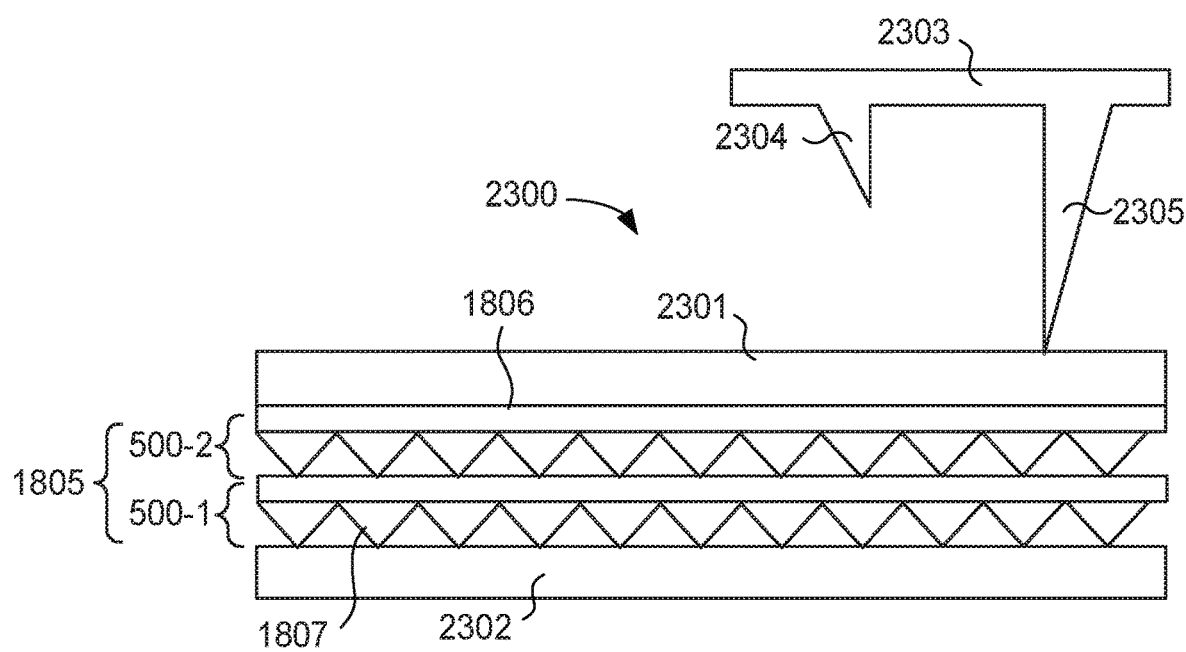
FIGS. 23 through 28 depict steps in a process for forming an ink layer at an edge of an optical film stack including printing onto an exposed surface of the film in accordance with some embodiments.

FIGS. 23 through 28 depict steps in a process for forming an ink layer at an edge of an optical film stack in accordance with some embodiments. FIG. 23 illustrates a subassembly 2300 that includes an optical film stack 1805 comprising first 500-1 and second 500-2 BEFs. In some implementations, the BEFs 500-1, 500-2 may be stacked such that the axes of the linear prisms of the first and second BEFs are disposed at an angle to one another. A first liner 2301 is disposed on a first surface 1806 of the optical film stack 1805 and a second liner 2302 is disposed on the second surface 1807 of the optical film stack 1805. FIG. 23 shows a knife 2303 having a first blade 2304 and a second blade 2305 poised to cut the optical film stack 1805. The first blade 2304 is shorter than the second blade 2305.

Figure 24:
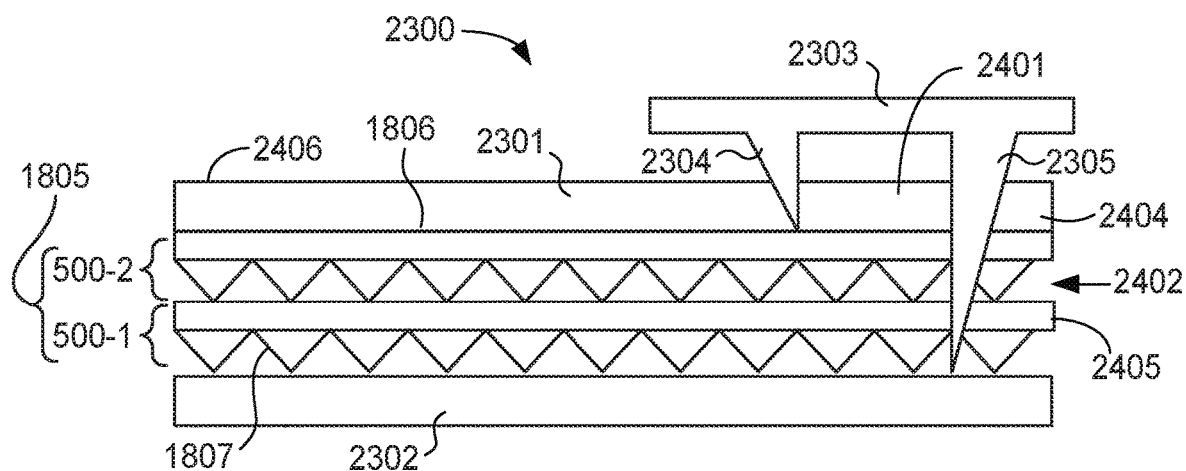
Figure 25:
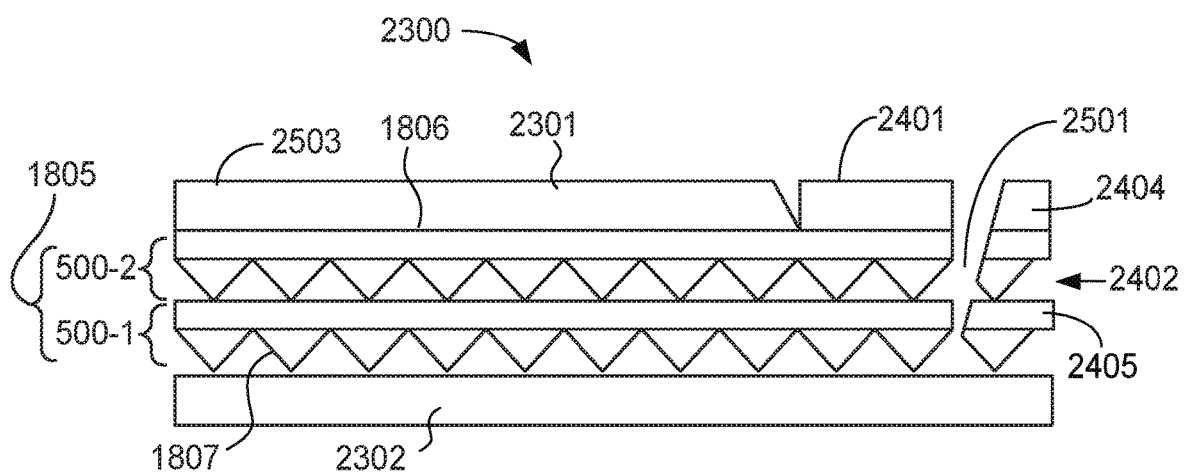

FIG. 24 illustrates the knife 2303 cutting the subassembly 2300. The first blade 2304 kiss cuts through the first liner 2301 to the first surface 1806 of the optical film 1805. The second blade 2305 kiss cuts through the first liner 2301 and the optical film 1805 to the second liner 2302. The cutting produces portions 2401, 2402 that are cut off from the major portion 2406 of the subassembly 2300. The first cut off portion 2401 comprises a portion of the first liner 2301. The second cut of portion 2402 comprises a second cut off portion 2404 of the first liner 2301 and a cut off portion 2405 of the optical film 1805. FIG. 25 shows the subassembly 2300 with the knife 2303 removed. The cutting produces a capillary channel 2501 between the cut off portion 2405 of the optical film 1805 and the major portion 2503 of the subassembly 2300.

Figure 26:
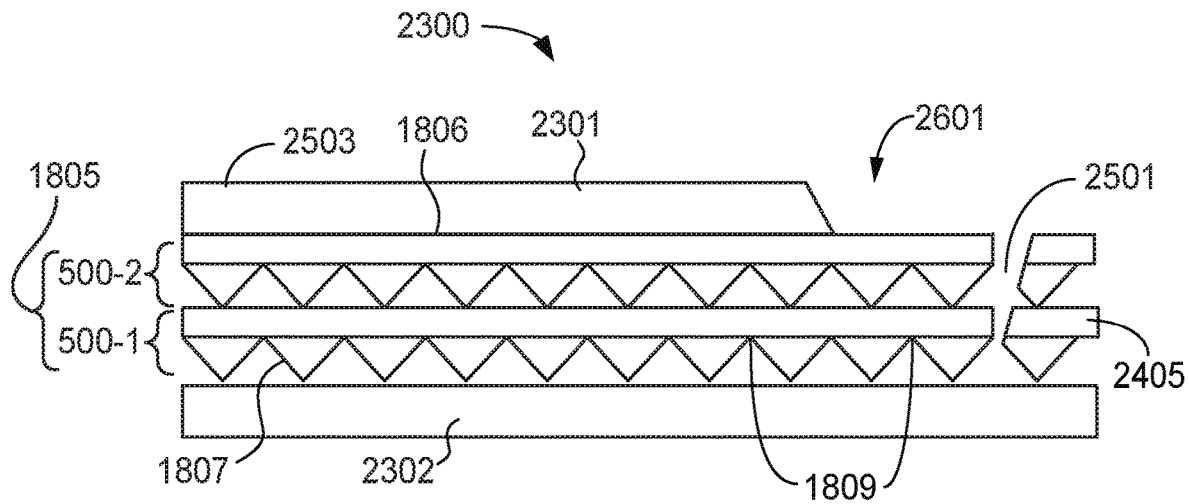

FIG. 26 shows the subassembly 2300 after the cut off first liner portions 2401, 2404 have been removed. Removal of the cut off liner portion 2401 exposes a portion 2601 of the first surface 1806 of the optical film 1805. The cut off portion 2405 of the optical film 1805 remains due to its attachment to the second liner 2302. A capillary channel 2501 disposed between the cut off portion 2405 and the major portion 2503 of the subassembly 2300.

Figure 27:
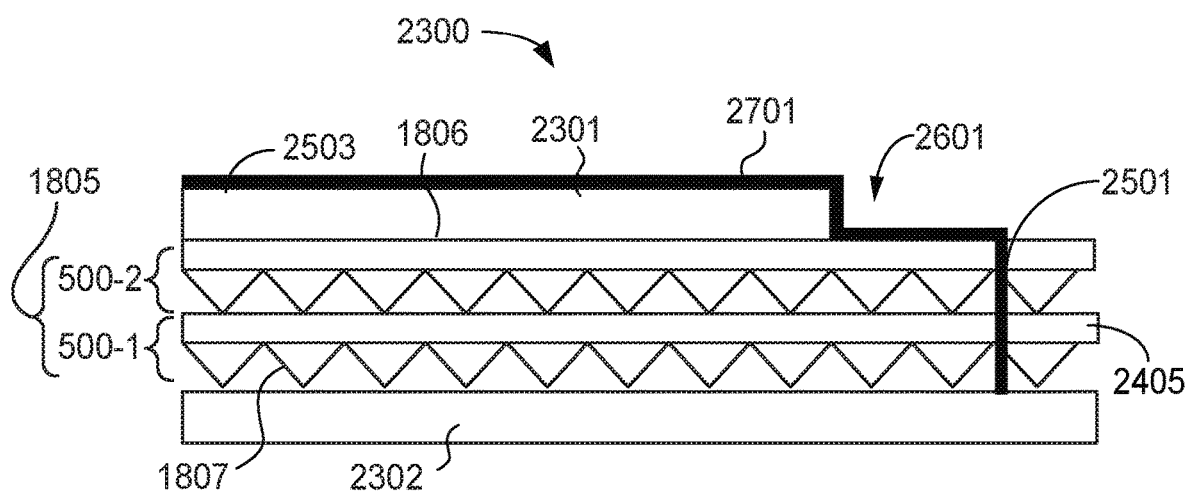

As depicted in FIG. 27, a flowable light control ink 2701 is applied to the surface of the first liner 2301 and to the portion 2601 of the first surface 1806 of the optical film 1805 that is exposed by removal of the first cut off liner portion 2401. The ink 2701 moves by capillary motion at least partially through the channel 2501 between the cut off portion 2405 and the major portion 2503 of the subassembly 2300. In some scenarios, the ink may be wicked through the capillary channels 1809 formed by the valleys of the microstructures of the second surface 1807 of the optical film stack 1805.

Figure 28:
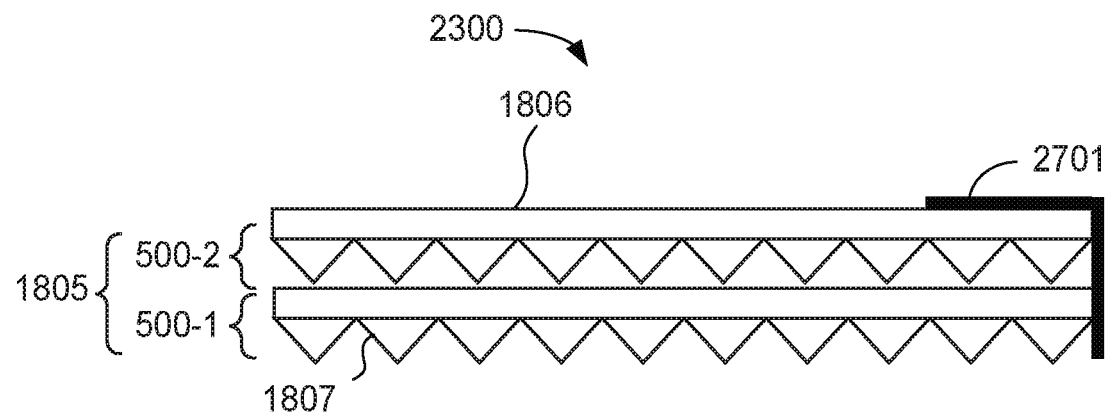

The extent of the movement of the ink 2701 through the capillary channels 2501, 1809 can be controlled, e.g., by curing the ink at a curing rate that controls the distance that the ink moves within the channels 2501, 1809. FIG. 28 illustrates the subassembly 2300 after removal of the first and second liners 2301, 2302 showing the ink 2701 disposed along the edge of the optical film stack 1805 and on the previously exposed portion 2601 of the first surface 1806 of the optical film stack 1805.

The processes depicted in FIGS. 5 through 28 can accommodate less precise ink deposition techniques due to the presence of the first liner which protects surfaces of the optical film that are not intended to be coated. The use of a top liner may encourage capillary action of the ink which can leave a larger coated edge on the surface of the optical film. When printing is performed directly on the top surface of BEF without a top liner, the coated edge on the top surface of the BEF may be reduced. However, this method involves closer registration of the printed pattern to the previously die cut part than the methods that utilize a top liner. Some processes for applying an edge light control layer (ink) use more precise deposition techniques as described with reference to FIGS. 29 through 33.

Figure 29:
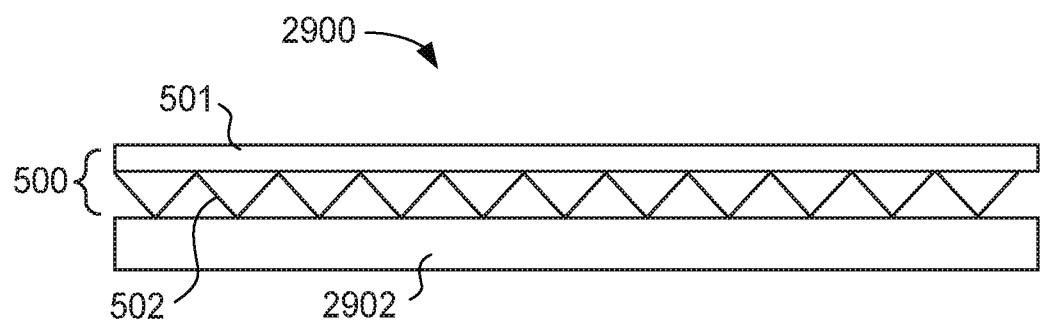

FIG. 29 shows a subassembly 2900 comprising an optical film 500 having a first major surface 501 and a second major surface 502 before an edge light leakage control layer is installed. A liner 2902 is disposed on the second major surface 502 of the optical film 500. A liner may or may not be installed on the first major surface 501. As depicted in FIG. 30, the subassembly 2900 is converted by cutting (e.g., by die cutting or laser cutting) through the first liner (if present), through the optical film 500, to the second liner 2902 with a kiss-cut technique. The distance between the cuts is dimensioned to accommodate the particular assembly in which the subassembly 2900 will be installed. The converting process also put places fiducial marks on the first surface 501 of optical film 500. In FIG. 30 arrows 3091 and 3092 indicate the locations of the cuts made to the subassembly 2900. Arrow 3093 indicates the location of the fiducial mark made on the first surface 501 of the optical film 500.

As shown in FIG. 31, the conversion process cuts capillary channels 3106, 3107 through the optical film 500 and makes a fiducial mark 3105 on the first surface 501 of the optical film 500. The channels 3106, 3106 divide the optical film 500 into a major portion 3101 of the subassembly 2900, a first cut off portion 3102, and a second cut off portion 3103. The first capillary channel 3106 is disposed between the major portion 3101 of the subassembly 2900 and the first cut off portion 3102. A second capillary channel 3107 is disposed between the major portion 3101 of the subassembly 2900 and the second cut of portion 3103. In each of these portions 3101, 3102, 3105, the second liner 2902 remains adhered to the optical film 500, thus the subassembly 2900 remains intact for the subsequent printing step.

Figure 32:
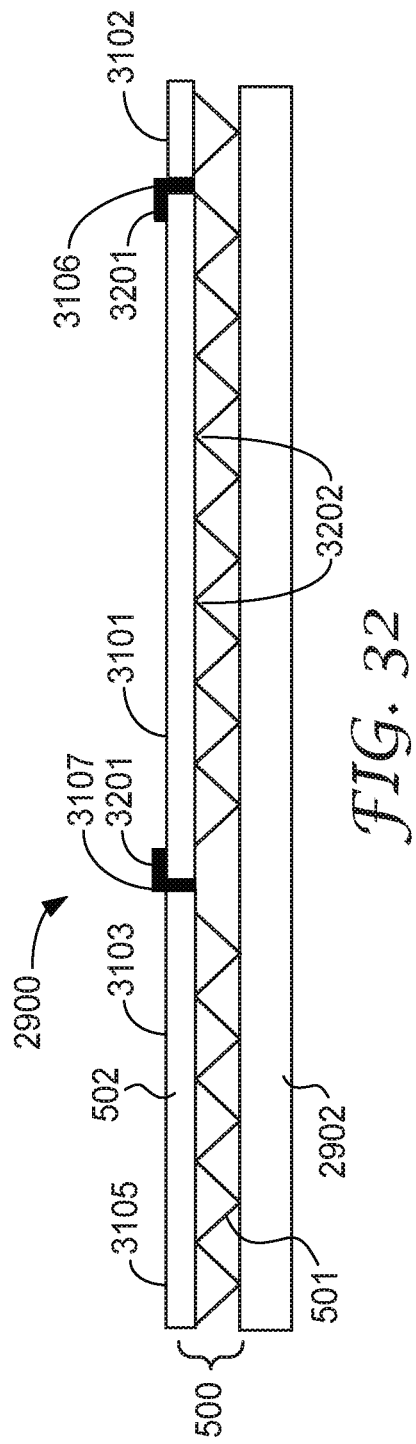
Figure 33:
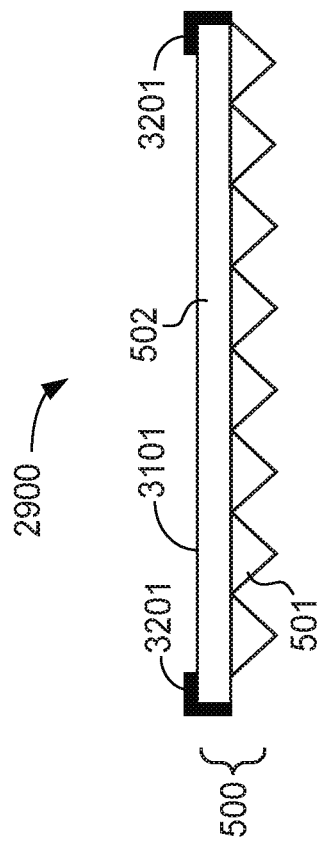

In registration with the fiducial mark 3105, ink 3201 is applied to the first surface 501 of the optical film 500 near the first and/or second capillary channels 3106, 3107 as illustrated in FIG. 32. The ink 3201 moves by capillary motion through the capillary channels 3106, 3107 and may move through the capillary channels 3202 formed by the valleys between the microstructures on the second surface 502 of the optical film 500. The extent of the movement of the ink 3201 through the capillary channels 3106, 3107, 3202 can be controlled, e.g., by curing the ink at a curing rate that sets the distance that the ink can flow within the channels 3106, 3107, 3202. FIG. 33 illustrates the subassembly 2900 after removal of the second liner 2802, and the first and second cut off portions 3102, 3103. The ink 3201 is disposed along the edges of the optical film 500 and extends a distance onto the second surface 502 of the optical film 500.

Example 1

An optical film assembly (composed of three layers including a top liner, BEF, and a bottom liner) was converted by kiss cutting through the three layers of top liner and BEF via platen die. The top liner remained over most of the BEF and the optical film remained attached to the bottom liner which was intact. The cut film was ink jet over-printed with a line of blue, UV curable (3M™ UV Inkjet Ink 1504 Cyan) ink in the slit between the screen film and the weed. A single line was printed with a 10 pL head (Fuji PN 21002011-46) and at 1200 dpi onto the exposed edge of the die cut part using a Fuji, DMP 2800 Desktop Material Jetting system.

Figure 34:
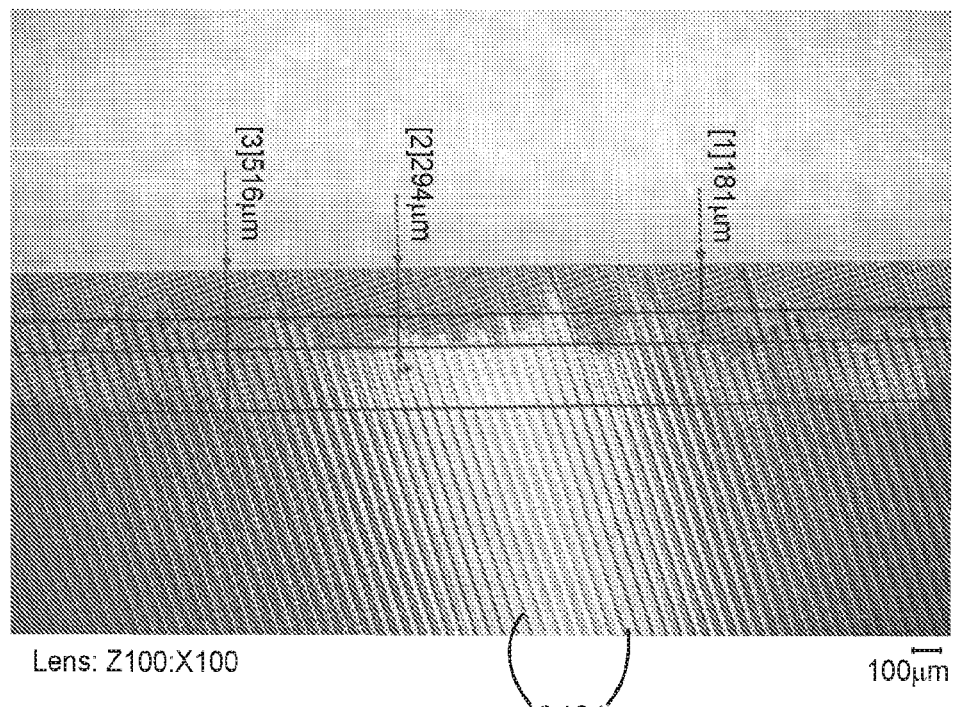
FIGS. 34 and 35 are photographs of example optical films having an edge light control layer in accordance with some embodiments.

FIG. 34 is a photograph of the part after printing. The image shows the BEF structure on one face of the film (diagonal features 3401 at the bottom of the photograph). Due to the relatively low viscosity of the inkjet ink, the jetted ink was able to seep (wick via capillary action) under the film and continue wicking up the micro replicated structure, resulting in a jagged edge. The magnitude of the distance this wicking provided varied from 516 um to approximately 294 um.

Example 2

An optical film as previously described in Example 1 was converted as in Example 1. The top liner was completely removed. The film was over printed with a line of black, UV curable ink. The exposed BEF was flexographically over printed with black ink with the registered print covering a small surface area near the edge of the part with ink.

Figure 35:
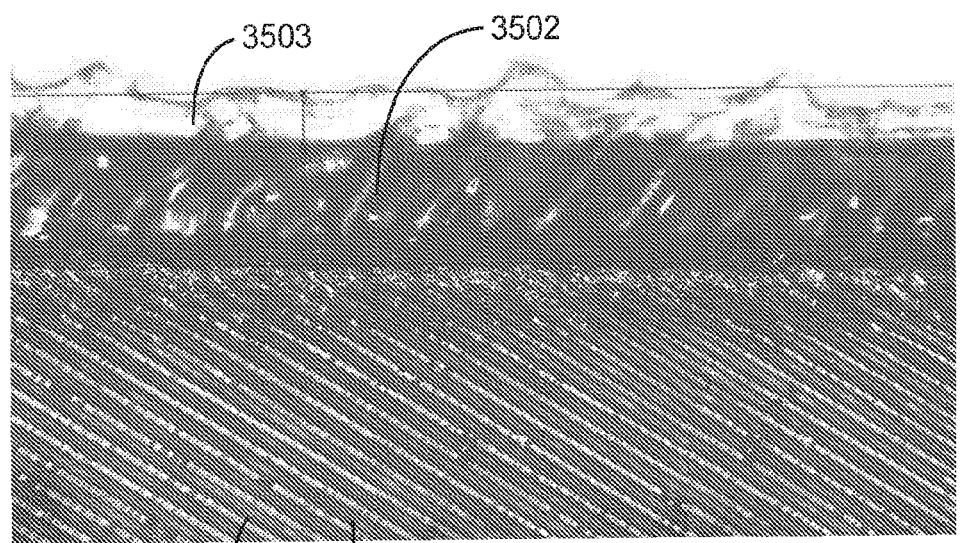

FIG. 35 is a photograph of the edge of a printed BEF from this example. The image shows the BEF structure on one face of the film (diagonal features 3501 at the bottom of the photograph). The edge 3502 of the film is shown substantially covered by the ink. An uncoated diffusion layer 3503 is at shown at the top edge of the photograph. The diffusion layer of the optical film was not coated because it was in intimate contact with the bottom liner. The wicking into the diagonal features 3501 of the BEF was limited to less than about 50 μm. This wicking was limited by the "pinning" process (UV curing unit immediately after printing).

Example 3

Figure 36:
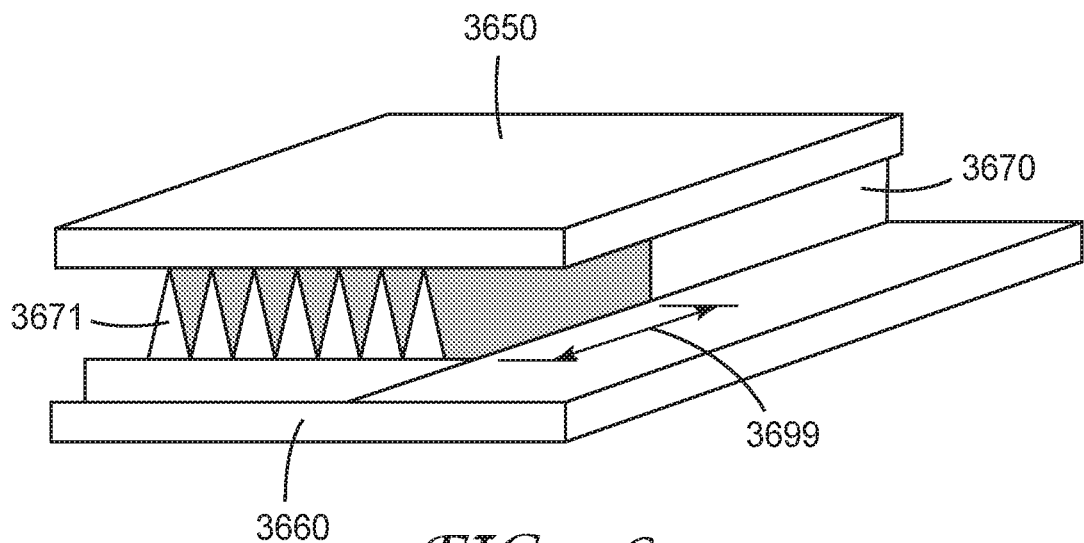
FIGS. 36 and 37 illustrate capillary action of the ink in accordance with some embodiments.
Figure 37:
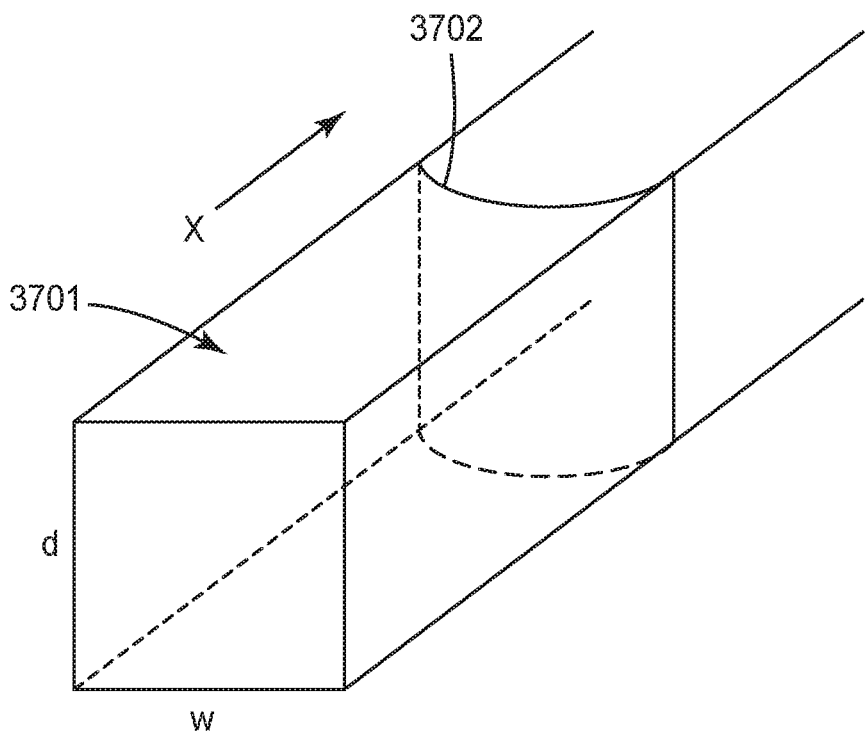

The mechanism of the capillary action of the ink is described with reference to FIGS. 36 and 37.

Flexographic printing was performed on a pre-cut film stack of top liner 3650, Advanced Structured Optical Composite (ASOC) film 3670, and bottom liner 3660. The printing pattern was laid upon the top liner near the cut area. Ink was restricted to an area near the precut line. Immediately after printing the ink began "wicking" into the BEF structures. The height and pitch of the structures 3671 of the film 3670 define a series of grooves that have a cross section commonly identified as 90/24 brightness enhancement film (BEF) grooves (90 micron high triangular features with a pitch between each triangular feature of 24 microns).

Capillary flow of a fluid in a closed channel is a subject within the broader science of fluid dynamics. The relationship describing capillary flow in a rectangular closed channel 3701 of width, w, and height, d, is provided by equations 1 and 2 below with reference to FIG. 37. The liquid 3702 in the channel 3701 has surface tension, $\gamma_{LV}$, contact angle θ, and viscosity η.

$$\text{Hydraulic radius: } r^H = \frac{wd}{2(w+d)} \quad [1]$$

$$\text{Position at time } t\colon x^2 = \frac{r^H \gamma_{LV} \cos\theta}{2\eta} t \quad [2]$$

Although the 90/24 BEF grooves are triangular instead of rectangular, the basic relationship for position of capillary flow with respect to time provided in equations 1 and 2 is applicable.

In this example, for a 300 cps ink, the position 3699 of the leading edge of the ink into the groove with a cure time 15 seconds after printing was in the range of about 250 microns. According to the relationship derived from equations 1 and 2 above, rapid curing after printing (e.g., 1 second instead of the initial 15 seconds) should be $1/\sqrt{15}$ or approximately 3.87 divided into the 250 micron second capillary position (e.g., 64 microns).

Items described in this disclosure include:

Item 1. A method comprising:
  cutting an optical film having a first surface, an opposing second surface, and a thickness normal to the first and second surfaces, the cutting forming a channel at least partially through the thickness of the film; and
  printing a light control material proximate to the second surface of the film, such material traversing through the channel by capillary motion.

Item 2. The method of item 1, further comprising controlling movement of the light control material such that the material moves a predetermined distance through the channel or onto the first surface of the film.

Item 3. The method of any of items 1 through 2, wherein cutting the optical film comprises rotary die cutting, platen cutting, or laser cutting.

Item 4. The method of any of items 1 through 3, further comprising applying a mask layer to the first surface of the optical film before the cutting.

Item 5. The method of item 4, wherein printing the light control material proximate to the first surface comprises printing the light control material onto the mask layer.

Item 6. The method of item 4, further comprising:
  cutting the mask layer to define an exposed region of the first surface;
  wherein:
  cutting the film and cutting the mask layer occurs substantially simultaneously in time; and
  printing the light control material comprises printing the light control material onto the mask layer and onto the exposed region of the first surface.

Item 7. The method of item 4, wherein cutting the film and cutting the mask layer comprises cutting the film and the mask layer with the same die.

Item 8. The method of any of items 1 through 7, further comprising:
  forming fiducial marks on the first surface of the film; and
  printing the light control material in registration with the fiducial marks.

Item 9. The method of item 8, wherein:
  cutting the film comprises laser cutting the film; and
  forming the fiducial marks comprises laser forming the fiducial marks concurrently with laser cutting the film.

Item 10. The method of any of items 1 through 9, wherein printing the light control material comprises flexographic printing or ink jet printing.

Item 11. The method of any of items 1 through 10, wherein printing the light control ink comprises printing a light absorbing ink or printing a light reflecting ink.

Item 12. The method of any of items 1 through 11, wherein the optical film comprises one or more of a light guiding film, a brightness enhancement film comprising microstructures, a specular reflector film, and a diffuser film.

Item 13. The method of any of items 1 through 12 wherein controlling the movement of the light control material comprises partially curing the material.

Item 14. The method of item 13, wherein curing the light control material comprises directing ultraviolet (UV) light from a UV light source toward the film in a region near the channe.

Item 15. The method of item 14, wherein controlling the movement of the light control material comprises controlling one or both of an intensity of the UV light at the curing region and a time that the curing region is exposed to the UV light.

Item 16. The method of item 13, wherein curing the light control material comprises partially curing the light control material by one or more of drying, heating, and UV light exposure.

Item 17. The method of any of items 1 through 16, wherein controlling the movement of the light control material comprises controlling the capillary motion of the light control material through the channe.

Item 18. The method of any of items 1 through 17, wherein controlling the movement of the light control material comprises changing a viscosity of the light control material.

Item 19. The method of any of items 1 through 18, wherein controlling the movement of the light control material comprises limiting movement of the light control material on the second surface to within 100 µm from an edge of the film.

Item 20. The method of any of items 1 through 19, wherein cutting the film comprises cutting the film to define a first portion and a second portion, wherein sides of the channel form edges of the first portion and the second portion.

Item 21. A method comprising:
  cutting an optical film having a first surface, an opposing second surface comprising microstructures, and a thickness normal to the first and second surfaces, cutting the optical film forming a channel through the thickness of the film;
  printing a light control ink toward the first surface of the film, the ink traversing through the channel and between the microstructures of the second surface by capillary movement; and
  controlling the capillary movement of the ink such that the ink moves a predetermined distance from the channel between the microstructures of the second surface.

Item 22. The method of item 21, wherein the microstructures comprise linear triangular prisms.

Item 23. The method of any of items 21 through 22, wherein the optical film is a multilayer film comprising:
   a first film layer; and
   a second film layer, wherein the first film layer comprises the first surface and the second film layer comprises the second surface.
Item 24. The method of item 23, wherein:
   the second film layer comprises microstructures; and
   controlling the capillary movement of the ink comprises controlling the capillary movement of the ink between the microstructures of the first film layer and between the microstructures of the second film layer.
Item 25. The method of item 23, wherein:
   the second film layer comprises microstructures; and
   the microstructures of the first film layer are disposed at an angle to the microstructures of the second film layer.
Item 26. The method of any of items 21 through 25, wherein:
   the optical film is a multilayer optical film; and
   cutting the channel comprising cutting the channel through the multiple layers of the multilayer optical film.
Item 27. A method of using an optical film comprising:
   receiving light at an optical film having a structured surface, an opposing surface, and one or more edges extending between the structured and opposing surfaces;
   reflecting light received at angles greater than or equal to a critical angle for total internal reflection at microstructures of the structured surface of the optical film;
   emitting light received at angles less than the critical angle for total internal reflection from the structured surface of the optical film; and
   absorbing or reflecting light by a layer of ink disposed at edges of the optical film.
Item 28. An optical film comprising:
   a first surface;
   an opposing second surface;
   an edge between the first surface and the second surface; and
   a light blocking ink layer disposed on the edge.
Item 29. The optical film of item 28, wherein the second surface comprises microstructures.
Item 30. The optical film of any of claims 28 through 29, wherein the light blocking ink layer is disposed on the edge and on the second surface of the optical film.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:
1. A method comprising:
   cutting an optical film having a first surface, an opposing second surface, and a thickness normal to the first and second surfaces, the cutting forming a channel at least partially through the thickness of the film;
   printing a light control material proximate to a surface of the film, the light control material traversing through the channel by capillary motion, and
   controlling movement of the light control material such that the light control material moves a predetermined distance through the channel or onto the first surface of the film,
   wherein controlling the movement of the light control material comprises partially curing the light control material.
2. The method of claim 1, wherein cutting the optical film comprises rotary die cutting, platen cutting, or laser cutting.
3. The method of claim 1 further comprising:
   forming fiducial marks on the first surface of the film; and
   printing the light control material in registration with the fiducial marks.
4. The method of claim 3, wherein:
   cutting the film comprises laser cutting the film; and
   forming the fiducial marks comprises laser forming the fiducial marks concurrently with laser cutting the film.
5. The method of claim 1, wherein printing the light control material comprises flexographic printing or ink jet printing.
6. The method of claim 1, wherein printing the light control material comprises printing a light absorbing ink or printing a light reflecting ink.
7. The method of claim 1, wherein the optical film comprises one or more of a light guiding film, a brightness enhancement film comprising microstructures, a specular reflector film, and a diffuser film.
8. The method of claim 1, wherein curing the light control material comprises directing ultraviolet (UV) light from a UV light source toward the film in a region near the channel.
9. The method of claim 8, wherein controlling the movement of the light control material comprises controlling one or both of an intensity of the UV light at the curing region and a time that the curing region is exposed to the UV light.
10. The method of claim 1, wherein curing the light control material comprises partially curing the light control material by one or more of drying, heating, and UV light exposure.
11. The method of claim 1, wherein controlling the movement of the light control material comprises controlling the capillary motion of the light control material through the channel.
12. The method of claim 1, wherein controlling the movement of the light control material comprises changing a viscosity of the light control material.
13. The method of claim 1, wherein controlling the movement of the light control material comprises limiting movement of the light control material on the second surface to within 100 µm from an edge of the film.
14. The method of claim 1, wherein cutting the film comprises cutting the film to define a first portion and a second portion, wherein sides of the channel form edges of the first portion and the second portion.

* * * * *